(12) United States Patent
Purayil et al.

(10) Patent No.: US 11,990,108 B2
(45) Date of Patent: *May 21, 2024

(54) METHOD AND APPARATUS FOR RENDERING ITEMS IN A USER INTERFACE

(71) Applicant: NOKIA TECHNOLOGIES OY, Espoo (FI)

(72) Inventors: Sreejumon Purayil, Cupertino, CA (US); Mark Fulks, Danville, CA (US); Venkata Ayyagari, Pleasanton, CA (US); Pankaj Jain, San Jose, CA (US); Jerry Drake, Castro Valley, CA (US); Gabriel Nava-Vazquez, Campbell, CA (US); Adetokunbo Bamidele, Dublin, CA (US); Srikanth Challa, San Jose, CA (US); Kenneth Walker, Concord, CA (US)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 17/504,088

(22) Filed: Oct. 18, 2021

(65) Prior Publication Data

US 2022/0059058 A1 Feb. 24, 2022

Related U.S. Application Data

(63) Continuation of application No. 16/526,807, filed on Jul. 30, 2019, now Pat. No. 11,170,741, which is a
(Continued)

(51) Int. Cl.
*G09G 5/38* (2006.01)
*G01C 21/36* (2006.01)
(Continued)

(52) U.S. Cl.
CPC .......... *G09G 5/38* (2013.01); *G01C 21/3679* (2013.01); *G06F 3/0346* (2013.01); *G06F 3/147* (2013.01);
(Continued)

(58) Field of Classification Search
CPC ................ G09G 5/14; G09G 2340/10; G09G 2340/125; G09G 1/007; G06T 11/60;
(Continued)

(56) References Cited

U.S. PATENT DOCUMENTS

| | | | |
|---|---|---|---|
| 5,672,840 A * | 9/1997 | Sage | F41G 3/04 89/41.22 |
| 6,064,749 A | 5/2000 | Hirota et al. | |

(Continued)

FOREIGN PATENT DOCUMENTS

| | | |
|---|---|---|
| EP | 0 816 999 A2 | 1/1998 |
| EP | 0867690 A1 | 9/1998 |

(Continued)

OTHER PUBLICATIONS

Extended European Search Report for corresponding European Patent Application No. 13754293.2 dated Oct. 16, 2015.
(Continued)

*Primary Examiner* — Todd Buttram
(74) *Attorney, Agent, or Firm* — ALSTON & BIRD LLP

(57) ABSTRACT

An approach is provided for rendering items in a user interface. The approach may, for instance, include processing a current orientation mode of a device, a detected attitude change of the device, and an attitude change threshold to determine a new orientation mode for the device. In an instance when the attitude change threshold is satisfied, then switching to the new orientation mode and in an instance when the new orientation mode is a landscape
(Continued)

orientation mode, then causing to present navigation information in an augmented reality display.

19 Claims, 26 Drawing Sheets

Related U.S. Application Data continuation of application No. 15/346,107, filed on Nov. 8, 2016, now abandoned, which is a continuation of application No. 14/381,082, filed as application No. PCT/FI2013/050218 on Feb. 27, 2013, now Pat. No. 9,514,717.

(60) Provisional application No. 61/604,813, filed on Feb. 29, 2012.

(51) Int. Cl.
| | |
|---|---|
| G06F 3/0346 | (2013.01) |
| G06F 3/147 | (2006.01) |
| G06T 15/00 | (2011.01) |
| G09G 5/377 | (2006.01) |
| H04L 29/08 | (2006.01) |
| H04L 67/52 | (2022.01) |
| H04L 67/5681 | (2022.01) |
| H04W 4/02 | (2018.01) |
| H04W 4/024 | (2018.01) |
| H04W 4/18 | (2009.01) |
| H04M 1/72457 | (2021.01) |

(52) U.S. Cl.
CPC .......... *G06T 15/005* (2013.01); *G09G 5/377* (2013.01); *H04L 67/52* (2022.05); *H04L 67/5681* (2022.05); *H04W 4/024* (2018.02); *H04W 4/025* (2013.01); *H04W 4/18* (2013.01); *G09G 2340/0464* (2013.01); *G09G 2340/0492* (2013.01); *G09G 2340/12* (2013.01); *G09G 2340/14* (2013.01); *G09G 2340/145* (2013.01); *G09G 2350/00* (2013.01); *G09G 2354/00* (2013.01); *H04M 1/72457* (2021.01)

(58) Field of Classification Search
CPC . G06T 11/206; H04N 5/44504; G06F 3/0481; G01S 7/06
See application file for complete search history.

(56) References Cited

U.S. PATENT DOCUMENTS

| | | | |
|---|---|---|---|
| 6,266,064 B1 | 7/2001 | Snyder | |
| 6,452,544 B1 | 9/2002 | Hakala et al. | |
| 6,597,406 B2 | 7/2003 | Gloudemans et al. | |
| 6,653,990 B1 | 11/2003 | Lestruhaut | |
| 6,765,569 B2 | 7/2004 | Neumann et al. | |
| 6,895,126 B2 | 5/2005 | Di Bernardo et al. | |
| 7,456,848 B2 | 11/2008 | Dolph et al. | |
| 7,720,436 B2 | 5/2010 | Hamyen et al. | |
| 8,201,436 B2 | 6/2012 | Murphy et al. | |
| 8,301,159 B2 | 10/2012 | Hamynen et al. | |
| 8,427,508 B2 | 4/2013 | Mattila et al. | |
| 8,483,712 B2 | 7/2013 | Hamynen et al. | |
| 8,675,025 B2 | 3/2014 | Arrasvuori | |
| 8,723,888 B2 | 5/2014 | Cudalbu et al. | |
| 8,769,437 B2 | 7/2014 | Myllyla | |
| 8,780,136 B2 | 7/2014 | Mattila et al. | |
| 8,849,821 B2 | 9/2014 | Schloter | |
| 8,913,088 B2 | 12/2014 | Doubleday et al. | |
| 8,963,954 B2 | 2/2015 | Sandberg | |
| 9,087,412 B2 | 7/2015 | Fulks et al. | |
| 9,118,832 B2 | 8/2015 | Parviainen | |
| 9,250,076 B2* | 2/2016 | Geelen | G01C 21/367 |
| 9,317,133 B2 | 4/2016 | Korah et al. | |
| 9,451,219 B2 | 9/2016 | Paalasmaa et al. | |
| 9,514,717 B2* | 12/2016 | Purayil | G06F 3/048 |
| 9,600,584 B2 | 3/2017 | Schloter | |
| 9,710,554 B2 | 7/2017 | Sandberg | |
| 9,727,128 B2 | 8/2017 | Nurmi | |
| 9,910,866 B2 | 3/2018 | Sandberg | |
| 9,928,627 B2 | 3/2018 | Fulks et al. | |
| 10,031,549 B2* | 7/2018 | Costa | G06F 1/1677 |
| 11,170,741 B2* | 11/2021 | Purayil | H04W 4/18 |
| 2001/0024236 A1 | 9/2001 | Sato et al. | |
| 2002/0085843 A1* | 7/2002 | Mann | E03C 1/057 |
| | | | 396/374 |
| 2002/0130906 A1 | 9/2002 | Miyaki | |
| 2004/0243306 A1 | 12/2004 | Han | |
| 2006/0075442 A1 | 4/2006 | Meadow | |
| 2006/0155466 A1 | 7/2006 | Kanda et al. | |
| 2007/0036348 A1 | 2/2007 | Orr | |
| 2007/0268310 A1 | 11/2007 | Dolph et al. | |
| 2008/0014987 A1 | 6/2008 | Kusuda | |
| 2008/0154488 A1* | 6/2008 | Silva | G01C 21/36 |
| | | | 701/426 |
| 2008/0154494 A1 | 6/2008 | Kato et al. | |
| 2009/0110302 A1 | 4/2009 | Snow | |
| 2009/0171570 A1 | 7/2009 | Chiba | |
| 2009/0182497 A1 | 7/2009 | Hagiwara | |
| 2009/0182501 A1 | 7/2009 | Fyke | |
| 2009/0315766 A1 | 12/2009 | Khosravy et al. | |
| 2009/0315995 A1 | 12/2009 | Khosravy et al. | |
| 2009/0319181 A1* | 12/2009 | Khosravy | G06Q 30/02 |
| | | | 701/532 |
| 2010/0123737 A1* | 5/2010 | Williamson | G06T 15/20 |
| | | | 345/672 |
| 2010/0194692 A1 | 8/2010 | Orr et al. | |
| 2010/0218113 A1 | 8/2010 | White et al. | |
| 2010/0285844 A1 | 11/2010 | Hosoi et al. | |
| 2011/0161875 A1 | 6/2011 | Kankainen | |
| 2011/0163874 A1* | 7/2011 | van Os | G01C 21/367 |
| | | | 345/173 |
| 2011/0267523 A1* | 11/2011 | Lu | H04N 23/667 |
| | | | 345/157 |
| 2011/0313657 A1 | 12/2011 | Myllymaki et al. | |
| 2012/0038671 A1 | 2/2012 | Min et al. | |
| 2012/0044401 A1* | 2/2012 | Parviainen | G06F 3/0304 |
| | | | 348/333.03 |
| 2012/0057064 A1 | 3/2012 | Gardiner et al. | |
| 2012/0059720 A1 | 3/2012 | Musabji et al. | |
| 2012/0159301 A1 | 6/2012 | Ramamurthy et al. | |
| 2012/0230429 A1 | 9/2012 | Boyce et al. | |
| 2012/0240077 A1 | 9/2012 | Vaittinen et al. | |
| 2012/0262372 A1 | 10/2012 | Kim et al. | |
| 2015/0049080 A1* | 2/2015 | Purayil | G01C 21/3889 |
| | | | 345/619 |
| 2015/0356763 A1 | 12/2015 | Fulks et al. | |
| 2017/0094165 A1 | 3/2017 | Meadow et al. | |
| 2017/0255703 A1 | 9/2017 | Schloter | |
| 2019/0355329 A1* | 11/2019 | Purayil | G06F 3/147 |
| 2022/0059058 A1* | 2/2022 | Purayil | G09G 5/38 |

FOREIGN PATENT DOCUMENTS

| | | | | |
|---|---|---|---|---|
| EP | 1519342 A1 | 3/2005 | | |
| EP | 1612707 A2 | 1/2006 | | |
| EP | 1614997 A1 | 1/2006 | | |
| EP | 1734341 A1 | 12/2006 | | |
| EP | 2202616 | 5/2010 | | |
| EP | 2 194 508 A1 | 6/2010 | | |
| EP | 2446380 A1 | 5/2012 | | |
| EP | 3702733 A1 | 9/2020 | | |
| JP | 2010091582 A * | 4/2010 | ......... | G01C 21/3682 |
| JP | 2011242989 A * | 12/2011 | | |
| WO | WO 2001/088687 A2 | 11/2001 | | |
| WO | WO 2005124594 A1 | 12/2005 | | |
| WO | WO 2007076555 A2 | 7/2007 | | |
| WO | WO 2010/032079 | 3/2010 | | |
| WO | WO 2010/149843 A1 | 12/2010 | | |

(56) References Cited

FOREIGN PATENT DOCUMENTS

| WO | WO 2012/107517 | 8/2012 | |
| WO | WO-2012107517 A1 * | 8/2012 | ............ G06F 1/1686 |
| WO | WO-2013128078 A1 * | 9/2013 | ............. G01C 21/00 |

OTHER PUBLICATIONS

International Search Report and Written Opinion from International Application No. PCT/FI2013/050218 dated Jul. 22, 2013.

Zhang et al, "Mobile Computing and Industrial Augmented Reality for Real-Time Data Access", ETFA 2001. 8th International Conference on Emerging Technologies and Factory Automation. Proceedings (Cat. No. 01TH8597), (Oct. 15-18, 2001), pp. 583-588.

Office Action received for corresponding U.S. Appl. No. 13/619,092 dated Jul. 14, 2014.

Office Action received for corresponding U.S. Appl. No. 13/619,092 dated Jan. 9, 2015.

Notice of Allowance received for corresponding U.S. Appl. No. 13/619,092 dated Mar. 16, 2015.

Office Action received for corresponding U.S. Appl. No. 14/381,082 dated Feb. 1, 2016.

Notice of Allowance received for corresponding U.S. Appl. No. 14/381,082 dated Jul. 29, 2016.

Office Action received for corresponding U.S. Appl. No. 14/741,648 dated Mar. 14, 2017.

Notice of Allowance received for corresponding U.S. Appl. No. 14/741,648 dated Oct. 4, 2017.

Non-Final Office Action for U.S. Appl. No. 15/346,107 dated Aug. 21, 2017.

Final Office Action for U.S. Appl. No. 15/346,107 dated Dec. 27, 2017.

Office Action for U.S. Appl. No. 15/346,107 dated May 4, 2018, 14 pages.

Office Action for U.S. Appl. No. 15/346,107 dated Nov. 30, 2018, 13 pages.

Non-Final Office Action for U.S. Appl. No. 16/526,807 dated Feb. 26, 2020.

Final Office Action for U.S. Appl. No. 16/526,807 dated Aug. 25, 2020.

Non-Final Office Action for U.S. Appl. No. 16/526,807 dated Feb. 2, 2021.

Notice of Allowance for U.S. Appl. No. 16/526,807 dated Jul. 9, 2021.

U.S. Appl. No. 15/346,107, filed Nov. 8, 2016, 2017/0053623 A1, Abandoned.

* cited by examiner

METHOD AND APPARATUS FOR RENDERING ITEMS IN A USER INTERFACE

CROSS-REFERENCE TO RELATED APPLICATIONS

This application is a continuation of application Ser. No. 16/526,807 filed Jul. 30, 2019, which is a continuation of application Ser. No. 15/346,107 filed Nov. 8, 2016, which is a continuation of application Ser. No. 14/381,082 filed Aug. 26, 2014, which is a national phase entry of International Application No. PCT/FI2013/050218, filed Feb. 27, 2013, which claims the benefit of U.S. Provisional Patent Application No. 61/604,813, filed Feb. 29, 2012, the entire contents of all of which are incorporated herein by reference.

BACKGROUND

Service providers and device manufacturers (e.g., wireless, cellular, etc.) are continually challenged to deliver value and convenience to consumers by, for example, providing compelling network services. In particular, these services can include location and navigation services on a mobile device (e.g., a smartphone). For example, mobile devices may include a display, location-based sensors (e.g., Global Positioning System (GPS) receivers), camera, and a processor, along with access to network-based databases of information. In addition, such devices can be programmed to provide a virtual view of geographic places or points of interest (POIs) and other display items surrounding the device to support augmented reality, virtual reality, three-dimensional mapping, and/or other similar perspective displays. In this context, the downloading of POI information can become challenging where network bandwidth varies. Moreover, the display of POIs can become challenging where there may be many different viewing modes for presentation of the POIs. Furthermore, the display of POIs can become challenging where information overload occurs on small display screens. For example, as more items are rendered in the perspective display, the representations or renderings (e.g., icons, touch buttons, thumbnails, etc.) of those items in display begin consuming the available display area which leading to obscuring, overlapping, etc., of the items. Accordingly, service providers and device manufacturers face significant technical challenges to enabling applications and services that support perspective-based displays to present POIs or other items so that users can more easily absorb and/or interact with those items. These challenges can be particularly acute on mobile devices where display, computing, memory, and/or other resources may be limited.

SOME EXAMPLE EMBODIMENTS

Therefore, there is a need for an approach for effectively rendering items in a user interface.

According to one embodiment, a method comprises determining one or more categories for pre-fetching by a device. The method also comprises causing, at least in part, pre-fetching of item information associated with one or more items for the one or more categories based, at least in part, on location information associated with the device. The method further comprises causing, at least in part, caching, at the device, of the item information associated with the one or more items.

According to another embodiment, an apparatus comprises at least one processor, and at least one memory including computer program code for one or more computer programs, the at least one memory and the computer program code configured to, with the at least one processor, cause, at least in part, the apparatus to determine one or more categories for pre-fetching by a device. The apparatus is also caused to cause, at least in part, pre-fetching of item information associated with one or more items for the one or more categories based, at least in part, on location information associated with the device. The apparatus is further caused to cause, at least in part, caching, at the device, of the item information associated with the one or more items.

According to another embodiment, a computer-readable storage medium carries one or more sequences of one or more instructions which, when executed by one or more processors, cause, at least in part, an apparatus to determine one or more categories for pre-fetching by a device. The apparatus is also caused to cause, at least in part, pre-fetching of item information associated with one or more items for the one or more categories based, at least in part, on location information associated with the device. The apparatus is further caused to cause, at least in part, caching, at the device, of the item information associated with the one or more items.

According to another embodiment, an apparatus comprises means for determining one or more categories for pre-fetching by a device. The apparatus also comprises means for causing, at least in part, pre-fetching of item information associated with one or more items for the one or more categories based, at least in part, on location information associated with the device. The apparatus further comprises means for causing, at least in part, caching, at the device, of the item information associated with the one or more items.

According to one embodiment, a method comprises determining to detect an attitude change associated with a device. The method also comprises processing and/or facilitating a processing of the attitude change associated with the device and an attitude change threshold to determine an intended orientation mode for the device. The method further comprises causing, at least in part, a rendering of one or more representations of one or more items in a user interface based, at least in part, on the intended orientation mode.

According to another embodiment, an apparatus comprises at least one processor, and at least one memory including computer program code for one or more computer programs, the at least one memory and the computer program code configured to, with the at least one processor, cause, at least in part, the apparatus to determine to detect an attitude change associated with a device. The apparatus is also caused to process and/or facilitate a processing of the attitude change associated with the device and an attitude change threshold to determine an intended orientation mode for the device. The apparatus is further caused to cause, at least in part, a rendering of one or more representations of one or more items in a user interface based, at least in part, on the intended orientation mode.

According to another embodiment, a computer-readable storage medium carries one or more sequences of one or more instructions which, when executed by one or more processors, cause, at least in part, an apparatus to determine to detect an attitude change associated with a device. The apparatus is also caused to process and/or facilitate a processing of the attitude change associated with the device and an attitude change threshold to determine an intended orientation mode for the device. The apparatus is further caused to cause, at least in part, a rendering of one or more representations of one or more items in a user interface based, at least in part, on the intended orientation mode.

According to another embodiment, an apparatus comprises means for determining to detect an attitude change associated with a device. The apparatus also comprises means for processing and/or facilitating a processing of the attitude change associated with the device and an attitude change threshold to determine an intended orientation mode for the device. The apparatus further comprises means for causing, at least in part, a rendering of one or more representations of one or more items in a user interface based, at least in part, on the intended orientation mode.

According to one embodiment, a method comprises determining one or more items for rendering in a user interface. The method also comprises causing, at least in part, a rendering at least one user interface object and the one or more representations of the one or more items in the user interface in a perspective view. The method further comprises causing, at least in part, a modification of the one or more representations that are within a region, of the user interface, associated with the at least one user interface object.

According to another embodiment, an apparatus comprises at least one processor, and at least one memory including computer program code for one or more computer programs, the at least one memory and the computer program code configured to, with the at least one processor, cause, at least in part, the apparatus to determine one or more items for rendering in a user interface. The apparatus is also caused to cause, at least in part, a rendering at least one user interface object and the one or more representations of the one or more items in the user interface in a perspective view. The apparatus is further caused to cause, at least in part, a modification of the one or more representations that are within a region, of the user interface, associated with the at least one user interface object.

According to another embodiment, a computer-readable storage medium carries one or more sequences of one or more instructions which, when executed by one or more processors, cause, at least in part, an apparatus to determine one or more items for rendering in a user interface. The apparatus is also caused to cause, at least in part, a rendering at least one user interface object and the one or more representations of the one or more items in the user interface in a perspective view. The apparatus is further caused to cause, at least in part, a modification of the one or more representations that are within a region, of the user interface, associated with the at least one user interface object.

According to another embodiment, an apparatus comprises means for determining one or more items for rendering in a user interface. The apparatus also comprises means for causing, at least in part, a rendering at least one user interface object and the one or more representations of the one or more items in the user interface in a perspective view. The apparatus further comprises means for causing, at least in part, a modification of the one or more representations that are within a region, of the user interface, associated with the at least one user interface object.

According to one embodiment, a method comprises determining one or more items for rendering in a user interface. The method also comprises causing, at least in part, a determination of one or more rendering locations in a three-dimensional model space for one or more representations of the one or more items based, at least in part, on location information associated with the one or more items. The method further comprises causing, at least in part, a grouping, a de-overlapping, or a combination thereof of the one or more representations based, at least in part, on an overlapping of the one or more rendering locations. The method additionally comprises causing, at least in part, a rendering of the one or more representations in the user interface based, at least in part, on the grouping, the de-overlapping, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to determine one or more items for rendering in a user interface. The apparatus is also caused to cause, at least in part, a determination of one or more rendering locations in a three-dimensional model space for one or more representations of the one or more items based, at least in part, on location information associated with the one or more items. The apparatus is further caused to cause, at least in part, a grouping, a de-overlapping, or a combination thereof of the one or more representations based, at least in part, on an overlapping of the one or more rendering locations.

According to another embodiment, a computer-readable storage medium carries one or more sequences of one or more instructions which, when executed by one or more processors, cause, at least in part, an apparatus to determine one or more items for rendering in a user interface. The apparatus is also caused to cause, at least in part, a determination of one or more rendering locations in a three-dimensional model space for one or more representations of the one or more items based, at least in part, on location information associated with the one or more items. The apparatus is further caused to cause, at least in part, a grouping, a de-overlapping, or a combination thereof of the one or more representations based, at least in part, on an overlapping of the one or more rendering locations. The apparatus is additionally caused to cause, at least in part, a rendering of the one or more representations in the user interface based, at least in part, on the grouping, the de-overlapping, or a combination thereof.

According to another embodiment, an apparatus comprises means for determine one or more items for rendering in a user interface. The apparatus also comprises means for causing, at least in part, a determination of one or more rendering locations in a three-dimensional model space for one or more representations of the one or more items based, at least in part, on location information associated with the one or more items. The apparatus further comprises means for causing, at least in part, a grouping, a de-overlapping, or a combination thereof of the one or more representations based, at least in part, on an overlapping of the one or more rendering locations. The apparatus additionally comprises means for causing, at least in part, a rendering of the one or more representations in the user interface based, at least in part, on the grouping, the de-overlapping, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-30 and 66-68.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for rendering items in a user interface are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "perspective display" refers to a user interface or a portion of a user interface for presenting location-based information in a three-dimensional (3D) representation or an approximation of a 3D representation. By way of example, perspective displays are used in applications supporting augmented reality, virtual reality, mapping, navigation, and the like. Although various embodiments are described with respect to a mapping display that is an augmented reality display, it is contemplated that various embodiments of the approach described herein may be used with any other type of perspective display.

Figure 1:
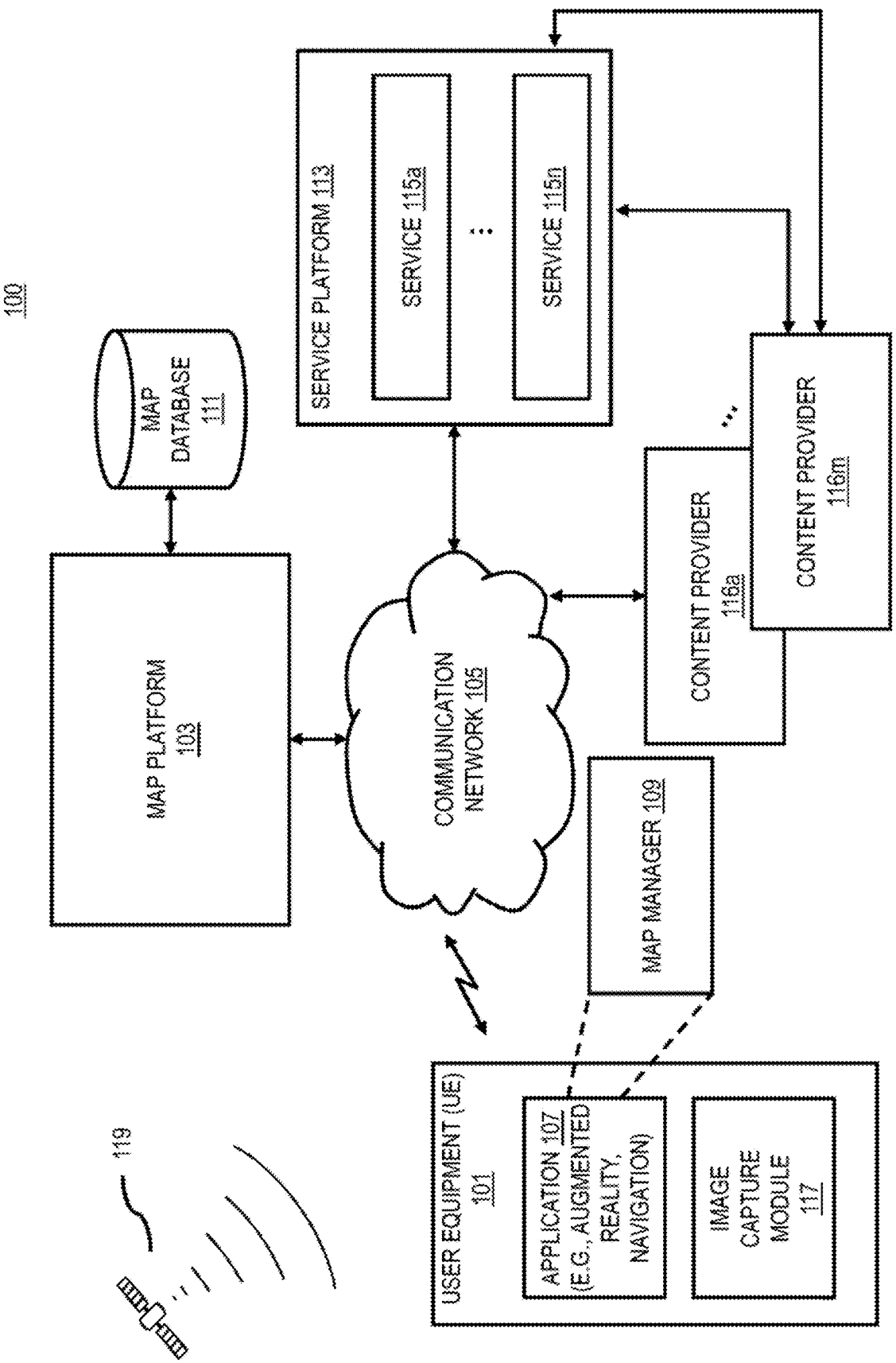
FIG. 1 is a diagram of a system capable of rendering items in a user interface, according to one example embodiment.

FIG. 1 is a diagram of a system capable of rendering items in a user interface, according to one example embodiment. It is becoming increasingly popular for service providers and device manufacturers to bundle or make available navigation and mapping services on an array of user devices (e.g., mobile handsets, computers, navigation devices, etc.). Such devices may utilize location-based technologies (e.g., Global Positioning System (GPS) receivers, cellular triangulation, assisted-GPS (A-GPS), etc.) to provide navigation and mapping information. One growing trend for these services is to move beyond two-dimensional (2D) maps and provide location services based on three-dimensional (3D) maps or representations of locations and/or routes of interest. For example, modern devices may utilize an augmented reality mode to superimpose graphics and text over video images showing points of interest (POIs) in front of the user. Moreover, certain devices may utilize perspective-based displays such as 3D representations (e.g., rendered 3D models) of buildings and streets to provide navigational, mapping, or other location-based information.

However, as previously discussed, the effective presentation of POI information, for instance, on perspective-based displays can be a challenge. As an example, because network bandwidth may vary based on the time, the location, etc., of the particular users, the time that it takes to download POI information, for instance, for presentation on the perspective-based displays will also be affected. In addition, although POIs may be presented in a number of different viewing modes, the manner in which POIs are displayed to the user based on how the user orients the device may be adjusted with regard to the manner in which to detect the orientation of the device and the viewing mode that the user wishes to see. Furthermore, such perspective-based displays can be complex and resource intensive to generate. For example, on a device with a touch screen, virtual POIs can be displayed as touchable buttons. This typically requires that the buttons be separated and have minimum screen dimensions. On a device with a camera, the virtual POIs can be displayed over the camera's viewfinder image. In most cases, it is desired that the representations (e.g., the touch buttons, icons, graphics, etc.) of the virtual POIs appears in the vicinity of the corresponding real world locations in the user interface. In addition, in the case of a mobile device (e.g., a smartphone, mobile handset, etc.), the available display is generally limited and can quickly become cluttered when there are many elements or items (e.g., POIs) to display. This cluttered display makes it much more difficult for a user to quickly identify important information. By way of example, in an augmented reality application, multiple nearby POIs can cause clutter in the display, making it difficult (if not impossible) to see all POIs. In other words, when there is a high density of POIs in the display, graphical representations (e.g., icons, labels, etc.) depicting the POIs can overlap and obscure one another. Therefore, service providers and device manufacturers face the problem of selecting a subset of the POIs or other items and then displaying them as separate buttons appearing near their location in the viewfinder. In other embodiments, service providers and device manufacturers may face the challenge of grouping and/or de-overlapping the representations to, for instance, declutter the perspective display. In addition, particularly for mobile devices, service providers face the additional problem of implementing a perspective-base display process that has enough computational efficiency for real-time or substantially real-time display.

To address this problem, a system 100 of FIG. 1 introduces the capability to effectively and efficiently render POIs (or other items) on a user interface. Specifically, in one embodiment, the system 100 may determine one or more categories for pre-fetching by a device. The system 100 may then cause, at least in part, pre-fetching of item information associated with one or more items for the one or more categories based, at least in part, on location information associated with the device. The system 100 may also cause, at least in part, caching, at the device, of the item information associated with the one or more items. In this way, the caching of the pre-fetched POI information associated with POIs for each of the determined categories enable a better user experience for future requests for POI information (e.g., for the particular location, area, etc.) since the POI information is readily available, for instance, even if current network connection is slow or non-existent. In addition, a common behaviour of many users is to initiate a query for a specific POI. However, when the desired POI is not found, these users typically initiate a subsequent query for a specific category. As such, POI information can be pre-fetched for all categories (or a certain categories determined to be popular) in anticipation of this type of behaviour. These pre-fetches can take place asynchronously, for instance, while user-requested POIs are being rendered on a user device. It is noted that, in various embodiments, the pre-fetching of the item information for the categories may be initiated upon the launch of a particular application (e.g., application 107), upon a "Big Move" (as discussed later), upon a user-initiated request for a specific POI, category, etc., not in the cache, etc.

In another embodiment, the system 100 may determine a user request specifying at least one of the one or more categories, at least one of the one or more items, or a combination thereof. The system 100 may then cause, at least in part, fetching of item information associated with the at least one category, the at least one item, or a combination thereof from the cached item information. As mentioned, since the user request is for item information (e.g., POI information) for one of the particular categories and/or for POIs of one of the particular categories that are already cached at the device, the item information will be retrieved much quicker, for instance, compared with having to downloading the item information over a slow mobile network data connection.

In another embodiment, the system 100 may cause, at least in part, an association of the one or more items with respective ones of the one or more categories and the location information associated with the device, wherein the fetching from the cached item information is based, at least in part, on the association. By way of example, the pre-fetched POI information associated with POIs for each category are cached in memory and keyed to a {category, location} pair (e.g., a direction of category-location and poi-collection mappings). As such, this enables an automated instantaneous fetch call from the cache when POIs are requested for a category. In addition, in other embodiments, the cache may also include item information associated with the latest searches or pre-fetches up to a certain predetermined threshold limit, for instance, to enable fast retrieval of item information for a number of locations, areas, etc.

In another embodiment, the system 100 may determine to detect a location change associated with the device based, at least in part, on the location information associated with the device. The system 100 may then cause, at least in part, pre-fetching of item information associated with one or more other items relating to the one or more categories based, at least in part, on the location change and a location change threshold. The system 100 may also cause, at least in part, caching, at the device, of the item information associated with the one or more other items. For example, if a user moves between two physical locations that more than a 100 meters, it may be termed a "Big Move" that is sufficient enough to satisfy the location change threshold. As noted, the pre-fetching and the caching of the new item information may take place automatically upon the detection of a location change that meets the location change threshold. Additionally, or alternatively, the pre-fetching and the caching of the new item information may occur after a user initiates a request for a particular POI that is not currently cached (e.g., because the user is in a new location, area, etc., for which POI information has not been pre-fetched) and after satisfying that device has moved sufficiently far enough to warrant a fresh download of POIs. The pre-fetching of the new item information may take occur asynchronously, for instance, while user-requested POIs are being rendered on a user device after the requested POI information is downloaded over a mobile network data connection.

In another embodiment, the system 100 may cause, at least in part, a cache invalidation with respect to the item information associated with the one or more items. In some embodiments, the cache invalidation may be performed on the item information associated with the one or more items upon the pre-fetching and/or the caching of the new item information associated with the one or more other items. By way of example, when the user has moved more than 100 meters (e.g., "Big Move") from the previous pre-fetching location, the cache may be purged of old POI data and repopulated with new POI data.

In another embodiment, the system 100 may determine a number of items to be pre-fetched for respective categories of the one or more categories, wherein the pre-fetching of the item information associated with the one or more items is further based, at least in part, on the determined number. In one scenario, the system 100 may determine that the default number of POIs for each category should be 50. Thus, for eight categories, there may exist approximately 400 POIs in cache at any time (e.g., if purged upon a new pre-fetching). If, for instance, POI data for each POI is about 100 bytes, it would result in an overhead of 40 kilobytes of memory. If there isn't sufficient amount of cache memory available for the pre-fetching process (e.g., low resources), the system 100 may determine a new (or temporary) pre-defined number of POIs to be pre-fetched that is lower than the default value of 50, for instance, to reserve cache resources.

In another embodiment, the system 100 may determine to detect an attitude change associated with a device. The system 100 may then process and/or facilitate a processing of the attitude change associated with the device and an attitude change threshold to determine an intended orientation mode for the device. The system 100 may also cause, at least in part, a rendering of one or more representations of one or more items in a user interface based, at least in part, on the intended orientation mode. In this way, the system 100 may, for instance, support several different approaches of showing POIs relative to the user's location in an 3D model space (e.g., Microsoft XNA 3D model space) based the device orientation. By way of example, the attitude change of the device may be sensed by the motion sensor at real time as the user points and handles the device. Detection of attitude changes may, for instance, include the use of the motion sensor to determine yaw, pitch, and roll with a specified angular value. The various transitional modes may include a camera view mode based on a landscape orientation mode (e.g., for floating objects superimposed on the viewfinder of the device), a list view mode based on a portrait orientation mode (e.g., for list of POI objects ordered by distance with an indication of direction as well as distance), and a map view mode based on a flat orientation mode (e.g., for map view with the user at the center of the map).

Thus, this enables the system 100 to adjust the POI view automatically rather than forcing the user to manually select a view type. For example, if the user is holding the device in landscape mode (e.g., as if taking a photograph), the POI view mode is automatically switched to the viewfinder. If the user is holding the device in portrait orientation (which is also the way the application control pages are shown), the POI view mode is automatically switched to the list view. If the user is holding the device flat with its face up, as is often the case when it is dropped down towards the belt to examine a map, the POI view mode is automatically switched to a map view. These views replace each other in the navigation stack so that the user does not need to traverse back through them all to get to the main controls.

In another scenario, the system 100 may track the attitude changes of the device with an emphasis, however, on the gravity-based values. These gravity-based values may be delivered as a set of floating point values in three dimensions, X, Y, and Z. A threshold value may be set for what the device must move beyond before it warrants a switch in views (e.g., a default threshold value of 0.9 (or 90% of the way to the new orientation)). It is noted, however, that these threshold values may be adjusted to match sensitivity in different devices. In addition, particular applications of the device may, for instance, include a dedicated listening module to estimate attitude changes. For example, the user interface page (known) within the application may currently be at the top of the view stack and the vector set may thus be analyzed to determine the device's orientation mode. The gravity values may locate the device's attitude in three dimensions: X (e.g., the device's attitude approaches +/−1.0 as device is held in landscape orientation), Y (e.g., the device's attitude approaches +/1.0 as device is held in portrait orientation), and Z (e.g., the device's attitude approaches −1 as device is held in flat orientation).

In another embodiment, the system 100 may determine that the attitude change associated with the device satisfies the attitude change threshold, wherein the intended orientation mode is determined based, at least in part, on the attitude change threshold being satisfied. Thus, the system 100 may rely on the attitude change based on whether the attitude change is sufficiently large enough to switch to a new orientation mode and, thus, also a new viewing mode.

In another embodiment, the determination of the intended orientation mode may further be based, at least in part, on a current orientation mode of the device. By way of example, the intended orientation mode may be based on the attitude change of the device, the attitude change threshold, and the current orientation mode. In one scenario, the device may currently be in a portrait orientation mode. If, for instance, the user alters the attitude of the device so that the device is now being held flat with the display facing up, the system 100 may estimate the new attitude of the device based on the attitude change from an attitude (or orientation) associated with the portrait orientation mode (the current orientation mode of the device). In this scenario, the system 100 is likely to determine that the device is now in a flat orientation mode, and thus, that the user intended for the device to be in the flat orientation mode.

In another embodiment, the system 100 may determine one or more items for rendering in a user interface. The system 100 may then cause, at least in part, a rendering at least one user interface object and the one or more representations of the one or more items in the user interface in a perspective view. The system 100 may also cause, at least in part, a modification of the one or more representations that are within a region, of the user interface, associated with the at least one user interface object. In some embodiments, the modification may include, at least in part, an enlargement of the one or more representations, presentation of additional information relating to associated items of the one or more representations, or a combination thereof.

As mentioned, many augmented reality applications have issues of POIs overlapping where the viewfinder of the device finds a high number of POI data on a fixed device display screen. These applications are unable to effectively display the details of each POI due to the screen size limitation of the device (e.g., mobile device) and the dimensions of the POIs. Thus, in one scenario, the system 100 may display the representations of the POI in a perspective view where the nearest POIs to the viewfinder of the device is rendered in a larger size, and the farthest POIs from the viewfinder is rendered in a smaller size. In addition, a magnifying glass (or lens) (e.g., the user interface object) may be placed at the center of the user interface. As such, if the user moves the viewfinder of the device to a particular POI (e.g., in the real world) such that the representation of the POI is within the region of the user interface associated with the magnifying glass, the particular POI representation may become enlarged when the magnifying glass "zooms-in" on the POI representation. Moreover, the POI representation may be modified or expanded to present additional details with respect to the associated POI when the POI representation is within the region associated with the magnifying glass.

In another embodiment, the system 100 may cause, at least in part, a determination of one or more rendering locations for the one or more representations based, at least in part, on location information associated with the one or more items. The system 100 may then cause, at least in part, a reduction in a size of the one or more representations, a skewing of the one or more representations, or a combination thereof based, at least in part, on an overlapping of the one or more rendering locations. As such, the system 100 may reduce, or eliminate, the overlapping of the one or more rendering locations by reducing the size of the one or more representations, skewing the one or more representations, etc. As a result, although there may be no current overlapping, the representations (as well as any POI details) may be more difficult for the user to see. Nonetheless, by using the magnifying glass (or some other user interface object), the user may simply move the viewfinder of the device to the particular POI that, for instance, the user desires to find more details about. Once the POI representation falls within the region of the user interface associated with the magnifying glass, the POI representation may be enlarged and rendered to produce additional details about the particular POI.

In another embodiment, the system 100 may determine a user request to modify a size, a shape, or a combination thereof of the region associated with the at least one user interface object. By way of example, the user may adjust the size and shape of the magnifying glass, for instance, to enlarge or alter the shape of the region associated with the magnifying glass.

In another embodiment, the system 100 may determine one or more items for rendering in a user interface. The system 100 may then cause, at least in part, a determination of one or more rendering locations in a three-dimensional model space for one or more representations of the one or more items based, at least in part, on location information associated with the one or more items. The system 100 may further cause, at least in part, a grouping, a de-overlapping, or a combination thereof of the one or more representations based, at least in part, on an overlapping of the one or more rendering locations. The system 100 may also cause, at least in part, a rendering of the one or more representations in the user interface based, at least in part, on the grouping, the de-overlapping, or a combination thereof.

In one embodiment, the system 100 generates a perspective display by converting geographic location information (e.g., latitude and longitude coordinates) of POIs to pixel locations in a user interface. In one embodiment, the locations are converted from coordinate information (e.g., latitude and longitude) to polar coordinates relative to a viewing location (e.g., location of a mobile device in an augmented reality display or a specified viewing location in a virtual reality display). Representations of the POIs are then mapped onto a predetermined surface (e.g., a cylinder or sphere) around the device using perspective information or an approximation of the perspective information (e.g., an artistic perspective). In one embodiment, the surface can be defined to extend beyond the visible range of a particular display (e.g., extend to a 360 degree representation of the area around a viewing location such as the cylinder or sphere mentioned above).

In one embodiment, the surface is then divided into an array of cells (e.g., a grid or other like pattern). In this way, representations of the POIs can be mapped to cover one or more of the cells and then arranged among the cells so that the representations do not overlap or substantially overlap. In one embodiment, the system 100 can employ a search process to locate non-overlapping cells or block of cells for associating with the representations of the POI. In some cases, the system 100 can discard any POI that cannot be assigned an empty cell or block of cells following the search process.

In one embodiment, to avoid discarding any POIs, the system 100 can employ means for grouping and/or de-overlapping the representations of the POIs. In one embodiment, to maximize the information (e.g., representations of POIs) presented to the user, the system 100 prioritizes the de-overlapping of close POIs to avoid grouping or clustering them. Then if de-overlapping is not possible (e.g., no more available display area), the system 100 can perform grouping. It is contemplated that the system 100 can vary the degree of grouping versus de-overlapping to balance the information presented against the available display resources.

In one embodiment, the system 100 can employ variety of means to de-overlap or maximize the available display area for presenting POIs. For example, the system 100 can use POI distance to dynamically resize the representations of the POIs or other items in a natural perspective-based layout. For example, POIs that are further away are rendered using smaller representations, which closer POIs are rendered in larger sizes. In some embodiments, the system 100 can further modify the representations of the POIs by adding perspective effects such as arching, rotating about one or more display axes, and the like based on, e.g., a calculated perspective for a selected viewing location.

In another embodiment, the system 100 can group one or more representations of the POIs in the perspective display based on their degree of overlapping. For example, the system 100 can sort the POIs by, for instance, distance from a viewing angle and then select the closest POI as an initial reference point for determining overlapping. Moving from closest to farthest, the system 100 evaluates whether a farther POI representation overlaps a closer POI representation. If the overlap is by more than a predetermined criterion (e.g., overlap by 10% or more), then the farther POI representation is grouped with the closer POI representation. In one embodiment, the group representation (e.g., based on the closest POI, a category of the grouped POIs, etc.) is then rendered at the centroid location of the group in the perspective display.

In another embodiment, once the representations are grouped, the system 100 can provide for expansion of the group based on user interaction. For example, a user can select the group representation in the perspective display to cause a rendering of the expansion of the POI representations in the group. In one embodiment, the rendering of the expansion displays a representation of a centroid of the group (e.g., determined based on location information of the group members) with representations of individual members of the group emanating from the centroid in concentric circles (e.g., depending on the number of group members). Selecting the centroid or issuing a grouping command can then regroup the representations to provide more available display space.

In one embodiment, the system 100 can further declutter a display by determining the overlapping of the representations of the POIs in the perspective display, and then applying one or more de-overlapping algorithms. As noted above, the de-overlapping algorithms can take precedence over the grouping algorithms to maximize the amount of information presented. Examples of such algorithms include, but are not limited to, a "global" de-overlapping and a "slice" de-overlapping. In one embodiment, global de-overlapping comprises determining a degree and direction (e.g., up, down, left, or right) of overlap between any two representations, and then moving one or more overlapping representations in the direction indicate by the overlapping to reduce (e.g., below a criterion such as below 10% overlap) or eliminate the overlap. For example, the system 100 can apply the global de-overlapping algorithm from closest to farthest POI until all POIs are de-overlapped.

In another embodiment, the slice de-overlapping algorithm comprises designating or "slicing" the perspective into regions and then evaluating the density of POI representations within each region. In some embodiments, the system 100 starts by evaluating overlapping of representations in the densest region first. The evaluation includes, for instance, determining representations that cross or straddle the boundaries between the regions. The system 100 then moves the location of the straddling representation to either of the regions adjacent to the boundary based on, for instance, a degree or percent of the straddling. In other embodiments, the system 100 can move the representation to the less dense region. Once a particular is region is processed, the system 100 "freezes" the region (e.g., locks the locations of the representations in that region) and moves to the next region. The system 100 then applies the same boundary analysis but will move representations only to regions that have not been previously frozen.

In one embodiment, the system 100 can further declutter the perspective display by determining whether certain POIs might be occluded by other features (e.g., buildings, terrain features, etc.) in the perspective display. Those representations that are occluded would then not be rendered in the perspective display. For example, the system 100 can leverage three-dimensional models of an environment depicted in the perspective display and then process the locations of the POIs against the models to determine potential occlusions.

In yet another embodiment, the number of cells in the array representing the perspective display, the size of the cells or block of cells, the length or extent of the search for non-overlapping cells, the grouping of the representations, the de-overlapping of the representations, and the like enable programmatic control over the resource burden associated with the processing of generating and/or rendering the perspective display. Following the defining of the surface (e.g., the cylinder) and the mapping of the representations of the POIs onto the surface, the system 100 can use, for instance, orientation information associated with a device (e.g., a compass heading) to select a portion of the surface to render in the perspective display of a location-based user interface based on a viewing location and perspective. For example, direction information is combined with information on the angle of view of the camera to select a portion of the surface to display.

If the compass heading or information changes but the location (e.g., latitude and longitude) of the device remains the same, the system 100 can just select a new portion of the surface to display that corresponds to the new orientation information. For example, in an augmented reality display, the system 100 displays a live camera view of the surrounding location and supplements with the live image with information (e.g., pictures, media, text labels, descriptions, etc.) relevant to each POI in a real time manner. The viewpoint for providing the augmented reality display is dependent on, for instance, where the user's device is pointed as determined by the device's location, directional heading, and tilt angle. Accordingly, as the user moves the device, the view in the augmented reality display and the displayed POIs change dynamically based on the movement. In one embodiment, a new set of POIs is downloaded only after the device moves far enough that it is no longer near or substantially near the original viewing location.

As noted previously, the mapping display of the system 100 is not limited to augmented reality displays and may include other types of mapping displays such an augmented virtual reality display (e.g., using 3D models to represent real world locations and POI information), conventional 3D maps, and/or any other display of perspective-based mapping, location, or navigation information. As used herein, in certain embodiments, mapping, location, and navigation information (collectively referred to herein as mapping information) refers to information about the user's location (e.g., map coordinates), other locations (e.g., destinations, POIs), relationships between locations (e.g., directions for travelling between the locations, relative positions of the locations, associations between the locations), and the like.

As shown in FIG. 1, a user equipment (UE) 101 may retrieve mapping information (e.g., 3D maps) and/or item information (e.g., POI information) from a map platform 103 via a communication network 105. The mapping information may be utilized by applications 107 on the UE 101 (e.g., an augmented reality application 107, a navigation application 107). The applications 107 may also include a map manager 109 to obtain the mapping information and/or the item information, and to generate perspective displays as discussed with respect to various embodiments described herein for use or presentation by the applications 107. Moreover, the POI or other item information to be included in the perspective display may be included in a map database 111 associated with the map platform 103 for access by the applications 107. In certain embodiments, POI and other related information is information that may be utilized by the augmented reality application 107 for display to the user. As discussed previously, POI information may also include or be associated with maps, satellite images, street and path information, signing information associated with maps, objects and structures associated with the maps, information about people and the locations of people, places of interest, associated metadata, coordinate information associated with the information, three-dimensional models of the environment, etc., or a combination thereof. A POI can be a specific point location that a person may, for instance, find interesting or useful. Examples of places or points-of-interest can include an airport, a bakery, a dam, a landmark, a restaurant, a hotel, the location of a person, or any point interesting, useful, or significant in some way.

In certain embodiments, POI information may be associated with content information including live media (e.g., streaming broadcasts), stored media (e.g., stored on a network or locally), metadata associated with media, text information, location information of other user devices, or a combination thereof. The content may be provided by the service platform 113 which includes one or more services 115a-115n (e.g., music service, mapping service, video service, social networking service, content broadcasting service, etc.), the one or more content providers 116a-116m (e.g., online content retailers, public databases, etc.), other content source available or accessible over the communication network 105. For example, the applications 107 may display location-related content information (e.g., content associated with a POI or with a particular location) in the perspective display in addition or as an alternate to the POI information. If there are high densities of such content information in the mapping display, the map manager 109 may be used to select and render the content information as well.

In one embodiment, an image capture module 117 of the UE 101 may be utilized in conjunction with the augmented reality application 107 to present location information (e.g., mapping and POI information) to the user. For example, the user may be presented with an augmented reality interface associated with the augmented reality application 107 or the navigation application 107 that presents mapping information (e.g., POI information), content information, and the like on a mapping display. In certain embodiments, the user interface may display a hybrid physical and virtual environment where 3D objects from the map database 111 are placed superimposed on top of a live (e.g., via a camera of the UE 101) or pre-recorded image (e.g., a 360° panoramic picture) of a corresponding location. In another embodiment, the mapping information and the maps presented to the user may be a simulated 3D environment in place of or in addition to the live augmented reality display. Accordingly, the map manager 109 can operate on the augmented reality mapping display, the simulated 3D display, and/or other perspective displays to select items and related information (e.g., POI information, location-related content information) presented therein.

As noted, the UE 101 may execute one or more of the applications 107 to view or access POI information. As mentioned above, the mapping information may include POI information, location information, directions or associations to a location, or a combination thereof. In one example, a default setting may allow the user to view information about POIs associated with locations, structures, and other objects associated with an augmented reality display or 3D environment. For example, the user may point the UE 101 towards a location or feature in the mapping display to view corresponding POI information. More specifically, the application 107 (e.g., the augmented reality application 107) may associate the location or feature with geographic coordinates based on the determined viewpoint. Then, the application 107 may retrieve POI information corresponding to the location from the map platform 103 for presentation in the mapping display. As discussed, if the POI information includes multiple POIs that are closely located, the mapping display can become cluttered, making it difficult to discern and identify the closed located POIs. In this case, the map manager 109 operates on the perspective display to reduce clutter by selecting and organizing POI or other item information for display.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, map platform 103, service platform 113, the services 115, and the content providers 116 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the augmented reality or navigation application 107 and the map platform 103 may interact according to a client-server model. According to the client-server model, a client process sends a message including a request to a server process, and the server process responds by providing a service (e.g., providing map information). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
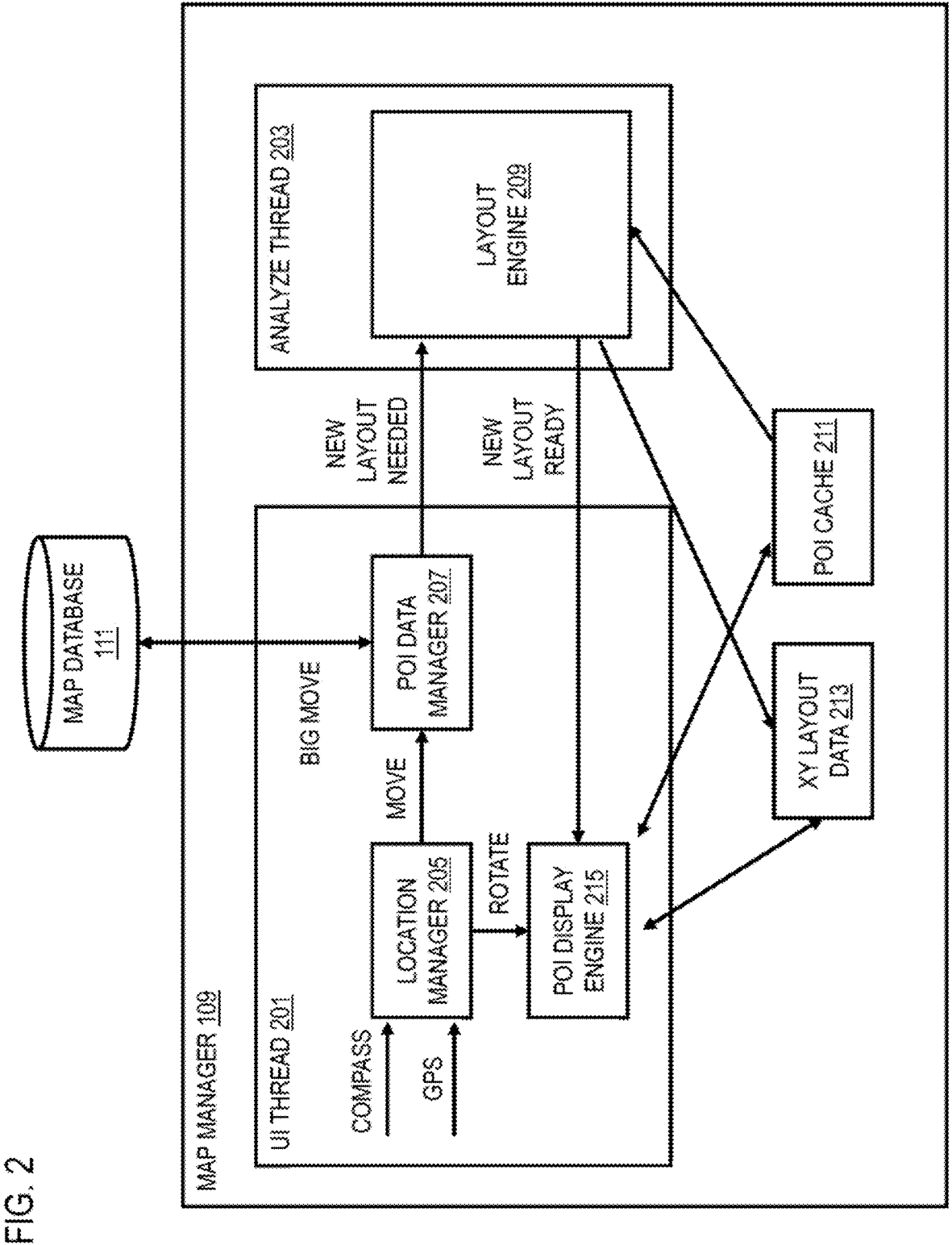
FIG. 2 is a diagram of the components of a map manager, according to one example embodiment.

FIG. 2 is a diagram of the components of a map manager, according to example one embodiment. By way of example, the map manager 109 includes one or more components for rendering items on a user interface. It is contemplated that the functions of these components may be combined in one or more components or performed by other components of equivalent functionality. As shown, the map manager 109 includes a user interface (UI) thread 201 and an analyze thread 203 that interact to select one or more items (e.g., POIs) for rendering on a user interface. By way of example, the UI thread 201 supports a location manager 205 for determining and processing location information associated with, for instance, a UE 101. In one embodiment, the location manager 205 interacts with location sensors of the UE 101 to receive orientation information (e.g., compass information) and location information (e.g., GPS information).

In addition, the location manager 205 can interact with a POI data manager 207 to determine what items (e.g., POIs) to display. More specifically, the POI data manager 207 fetches (e.g., via wireless or over-the-air connection) POI information from one or more remote services such as the map database 111 of the map platform 103 based on location information (e.g., GPS information) provided by the location manager 205. In one embodiment, because the GPS location changes as the device moves, the map manager 109 fetches POI data only when the move is sufficiently farther from the previous location when the previous set of POIs were fetched. By way of example, such a move (e.g., a move beyond a predetermined distance threshold) is dubbed as "Big Move" in FIG. 2.

In one embodiment, a predetermined number (the number is configurable) of POIs are fetched on a "Big Move" and cached (e.g., in the POI cache 211). More specifically, the POI data manager 207 determines that there is a "Big Move" and that a new layout of the perspective display is needed to accurately generate the view from the new viewing location. This determination causes the POI data manager 207 to direct a layout engine 209 to initiate generation of a new or updated perspective display. This process includes, for example, retrieving the POI information from the POI cache 211 and then determining the geographical locations of nearby POIs and/or items with respect to the new location. In one embodiment, the locations or nearby POIs are calculated and stored in a XY layout data module 213. The layout engine 209 then notifies a POI display engine 215 that the new layout is ready for rendering to the user.

In contrast, when a device moves a smaller distance (e.g., less than 50 m), dubbed as "Small Move", or when the change in location information is a change in orientation information (e.g., rotating, tilting, panning, the device), then new POIs may not be fetched. Instead the existing POIs are re-positioned and the perspective display is regenerated by the POI display engine 215. In one embodiment, the POI display engine 215 presents an augmented reality display by directing the image capture module 117 of the UE 101 to provide to a user a live camera view of a current location of the UE 101. The image capture module 117 may include a camera, a video camera, and/or other imaging device. In one embodiment, visual media is captured in the form of an image or a series of images. These images are then presented in the mapping display by the POI display engine 215.

Additionally, or alternatively, to generate the augmented reality display, the POI display engine 215 may provide a mapping display using non-reality based representations (e.g., a 3D simulated environment or other rendered maps) of a particular location as described above. For example, the POI data manager 207 may obtain mapping data (e.g., 3D models, map tiles, map images, terrain features, etc.) from the map database 111 or the map platform 103 to render the mapping display.

Thus employing techniques such as smart fetching, caching POIs, grouping, de-overlapping, and/or proprietary display algorithms, the system 100 provides the user with a seamless and fluid experience in viewing POIs while reducing potential clutter and information overload.

Figure 3:
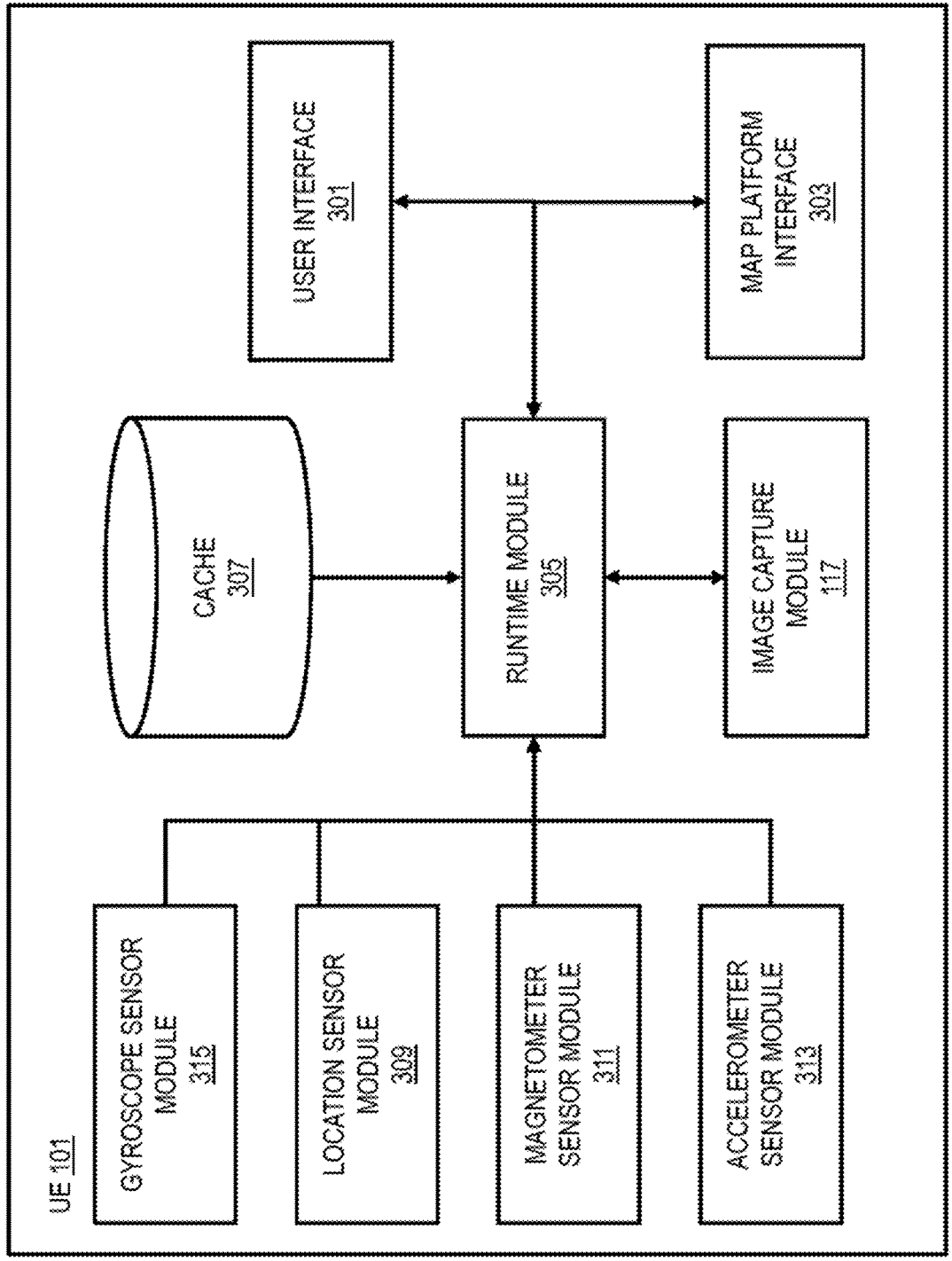
FIG. 3 is a diagram of the components of a user equipment capable of rendering items in a user interface, according to one example embodiment.

FIG. 3 is a diagram of the components of a user equipment capable of rendering items in a user interface, according to one example embodiment. By way of example, the UE 101 includes one or more components for grouping and/or de-overlapping items in a perspective display as discussed in various embodiments of the approach described herein. It is contemplated that the functions of these components may be combined in one or more components or performed by other components of equivalent functionality. In this embodiment, the UE 101 includes: (1) a user interface 301 to present a perspective display including, for instance, POI information; (2) a map platform interface 303 to retrieve POI information from the map platform 103, the service platform 113, and or the data providers 116; (3) a runtime module 305 for executing one or more applications (e.g., augmented reality application 107, navigation application 107) that includes or has access to a map manager 109; (4) a cache 307 to locally store POI information and/or related content information; (5) a location sensor module 309 to determine a location of the UE 101; (6) a magnetometer sensor module 311 to determine horizontal orientation or directional heading (e.g., a compass heading) of the UE 101; and (7) an accelerometer sensor module 313 to determine vertical orientation or an angle of elevation of the UE 101; and (8) an image capture module 117. Moreover, in some embodiments, it is noted that the UE 101 may include a gyroscope sensor module 315 to determine the angular momentum and orientation of the UE 101.

The perspective display may be presented to the user via the user interface 301, which may include various methods of communication. For example, the user interface 301 can have outputs including a visual component (e.g., a screen), an audio component (e.g., a verbal instructions), a physical component (e.g., haptic feedback), and other methods of communication. User inputs can include a touch-screen interface, microphone, camera, a scroll-and-click interface, a button interface, etc. Further, the user may input a request to start an application 107 (e.g., an augmented reality or navigation application) and utilize the user interface 301 to receive a perspective display including POI and/or other mapping information. Through the user interface 301, the user may request different types of content, mapping, or location information to be presented. Further, the user may be presented with 3D or augmented reality representations of particular locations and related objects (e.g., buildings, terrain features, POIs, etc. at the particular location) as part of a graphical user interface on a screen of the UE 101.

The map platform interface 303 is used by the runtime module 305 to communicate with the map platform 103. In some embodiments, the interface is used to fetch POI information and/or related content, mapping, and or location information from the map platform 103, service platform 113, and/or content providers 116*a*-116*m*. The UE 101 may utilize requests in a client server format to retrieve the POI and/or mapping information. Moreover, the UE 101 may specify location information and/or orientation information in the request to retrieve the POI and/or mapping information. The location sensor module 309, magnetometer sensor module 311, accelerometer sensor module 313, and image capture module 117 may be utilized to determine location and/or orientation information used in determining along which the direction the UE 101 is pointed (e.g., the viewpoint of the UE 101) so that POI and related information corresponding to the pointed direction can be retrieved. Further, this POI and mapping information may be stored in the cache 307 to be utilized in generating a perspective display at the UE 101.

In one embodiment, the location sensor module 309 can determine a user's location. The user's location can be determined by a triangulation system such as a GPS, assisted GPS (A-GPS) A-GPS, Cell of Origin, wireless local area network triangulation, or other location extrapolation technologies. Standard GPS and A-GPS systems can use satellites 119 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location sensor module 309 may also utilize multiple technologies to detect the location of the UE 101. GPS coordinates can provide finer detail as to the location of the UE 101. As previously noted, the location sensor module 309 may be utilized to determine location coordinates for use by the application 107 and/or the map platform 103.

The magnetometer sensor module 311 can include an instrument that can measure the strength and/or direction of a magnetic field. Using the same approach as a compass, the magnetometer is capable of determining the directional heading of a UE 101 using the magnetic field of the Earth. The front of the image capture device (e.g., a digital camera) (or another reference point on the UE 101) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer is utilized to determine the orientation of the user. This directional information may be correlated with the location information of the UE 101 to determine where (e.g., at which geographic feature, object, or POI) the UE 101 is pointing towards. This information may be utilized to select a first person view to render the perspective display.

Further, the accelerometer sensor module 313 may include an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer sensor module 313 can determine the angle the UE 101 is pointed as compared to Earth's gravity. In one embodiment, vertical directional data obtained from an accelerometer is used to determine the angle of elevation or tilt angle at which the UE 101 is pointing. This information in conjunction with the magnetometer information and location information may be utilized to determine a viewpoint to provide POI and mapping information to the user. As such, this information may be utilized in selecting available POI and/or other items to present information to the user. Moreover, the combined information may be utilized to determine portions of a particular 3D map or augmented reality view that may interest the user. In one embodiment, if the location information associated with one or more available POI items does not correspond to the viewpoint (e.g., is not visible in the selected viewpoint), one or more indicators (e.g., arrows or pointers) may be shown on the user interface to indicate the direction towards the location of the POI items.

In another embodiment, the user may manually input any one or more of the location, directional heading, and tilt angle to specify a viewpoint for displaying the user interface on the UE 101 instead of determining the viewpoint from the sensors. In this way, the user may select a "virtual viewpoint" to be a place other than the current location and pointing direction of the UE 101.

Images for supporting a graphical user interface can be captured using the image capture module 117. The image capture module 117 may include a camera, a video camera, a combination thereof, etc. In one embodiment, visual media is captured in the form of an image or a series of images. The image capture module 117 can obtain the image from a camera and associate the image with location information, magnetometer information, accelerometer information, or a combination thereof. As previously noted, this combination of information may be utilized to determine the viewpoint of the user by combining the location of the user, horizontal orientation information of the user, and vertical orientation information of the user. This information may be utilized to retrieve POI and mapping information from the map cache 307 or the map platform 103. In certain embodiments, the cache 307 includes all or a portion the information in the map database 111.

Figure 4:
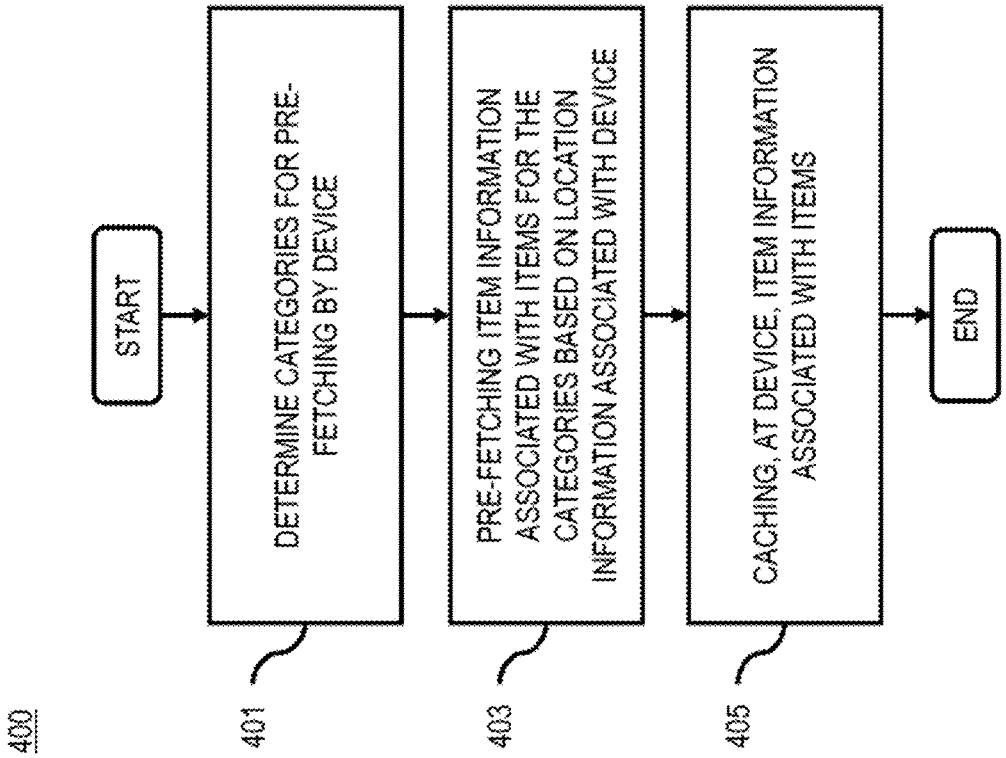
FIG. 4 is a flowchart of a process for pre-fetching item information associated with items for particular categories, according to one example embodiment.
Figure 23:
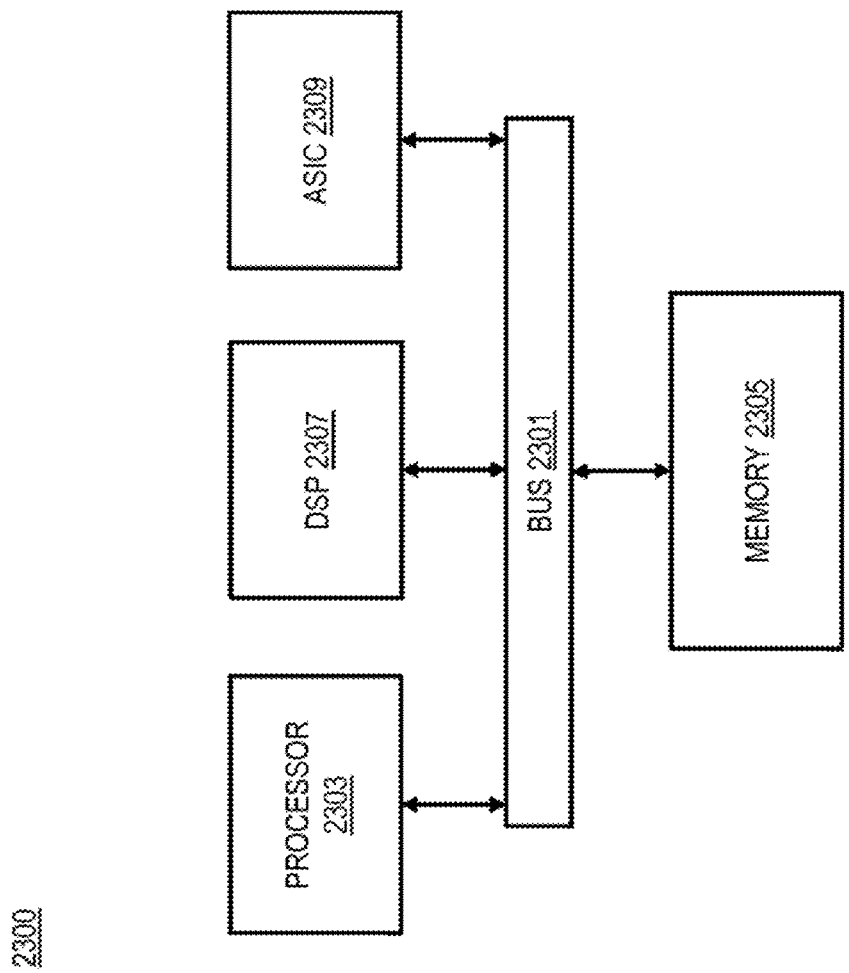
FIG. 23 is a diagram of a chip set that can be used to implement the example embodiments of the invention.

FIG. 4 is a flowchart of a process for pre-fetching item information associated with items for particular categories, according to one example embodiment. In one embodiment, the map manager 109 performs the process 400 and is implemented in, for instance, a chip set including a processor and a memory as shown in FIG. 23. In step 401, the map manager 109 may determine one or more categories for pre-fetching by a device. In step 403, the map manager 109 may cause, at least in part, pre-fetching of item information associated with one or more items for the one or more categories based, at least in part, on location information associated with the device. In step 405, the map manager 109 may cause, at least in part, caching, at the device, of the item information associated with the one or more items.

As discussed, the caching of the pre-fetched POI information associated with POIs for each of the determined categories enable a better user experience for future requests for POI information (e.g., for the particular location, area, etc.) since the POI information is readily available, for instance, even if current network connection is slow or non-existent. In addition, a common behaviour of many users is to initiate a query for a specific POI. However, when the desired POI is not found, these users typically initiate a subsequent query for a specific category. As such, POI information can be pre-fetched for all categories (or a certain categories determined to be popular) in anticipation of this type of behaviour. These pre-fetches can take place asynchronously, for instance, while user-requested POIs are being rendered on a user device. It is noted that, in various embodiments, the pre-fetching of the item information for the categories may be initiated upon the launch of a particular application (e.g., application 107), upon a "Big Move," upon a user-initiated request for a specific POI, category, etc., not in the cache, etc.

Figure 5:
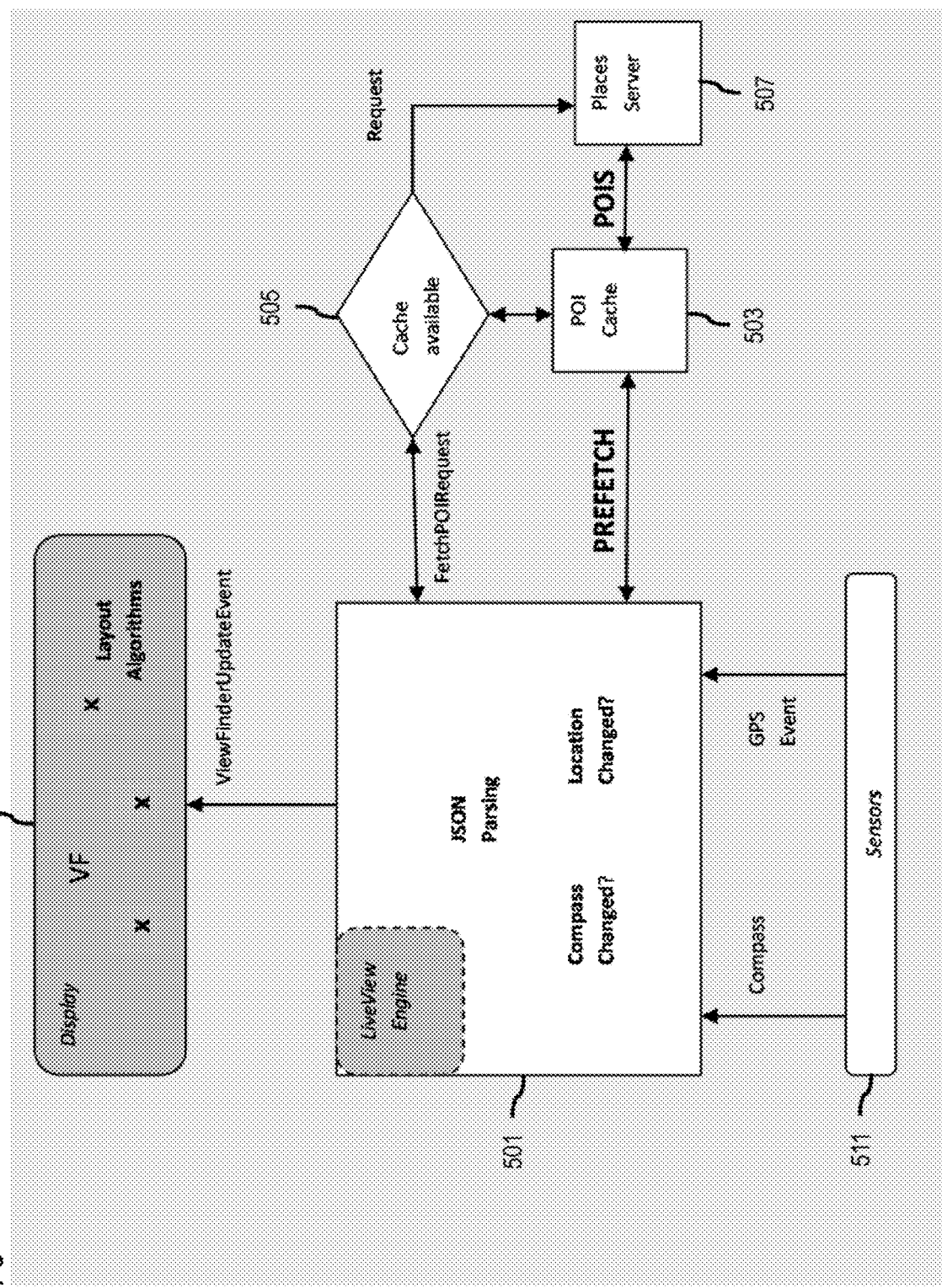
FIG. 5 is a flow diagram with respect to components utilized in the processes of FIG. 4, according to one example embodiment.

FIG. 5 is a flow diagram with respect to components utilized in the processes of FIG. 4, according to one example embodiment. As shown, the manager 501 (e.g., map manager 109) may initiate a pre-fetching of POI information associated with POIs for certain determined categories based on the location of the user device at the time of the pre-fetching, and cached the POI information in the POI cache 503 (e.g., POI cache 211). Thus, if a user initiates a request for POI information with respect to a specific category or a particular POI, the manager 501 may, at step 505, check the POI cache 503 first to see if the request can be satisfied by the cached POI information. If the POI information for the requested category or POI is cached, then the requested POI information is retrieved from the cache. Otherwise, the manager 501 may initiate a request over, for instance, a mobile network data connection to retrieve the requested POI from places server 507 (e.g., map database 111).

The retrieved POI information is then processed by the manager 501, and then rendered on the display 509 (e.g., perspective-based display). As indicated, the one or more sensors 511 (e.g., location sensor module 309, accelerometer sensor module 313, etc.) may be utilized to determine the location of the device. In addition, the sensors 511 may also be utilized to detect a location change and to facilitate the determination of whether the location change satisfies a location change threshold (e.g., whether the location change is a "Big Move") that may, for instance, cause a pre-fetching of new POI information for the new location, area, etc., and additionally depending on the user's interest profile and/or preferences.

Figure 6:
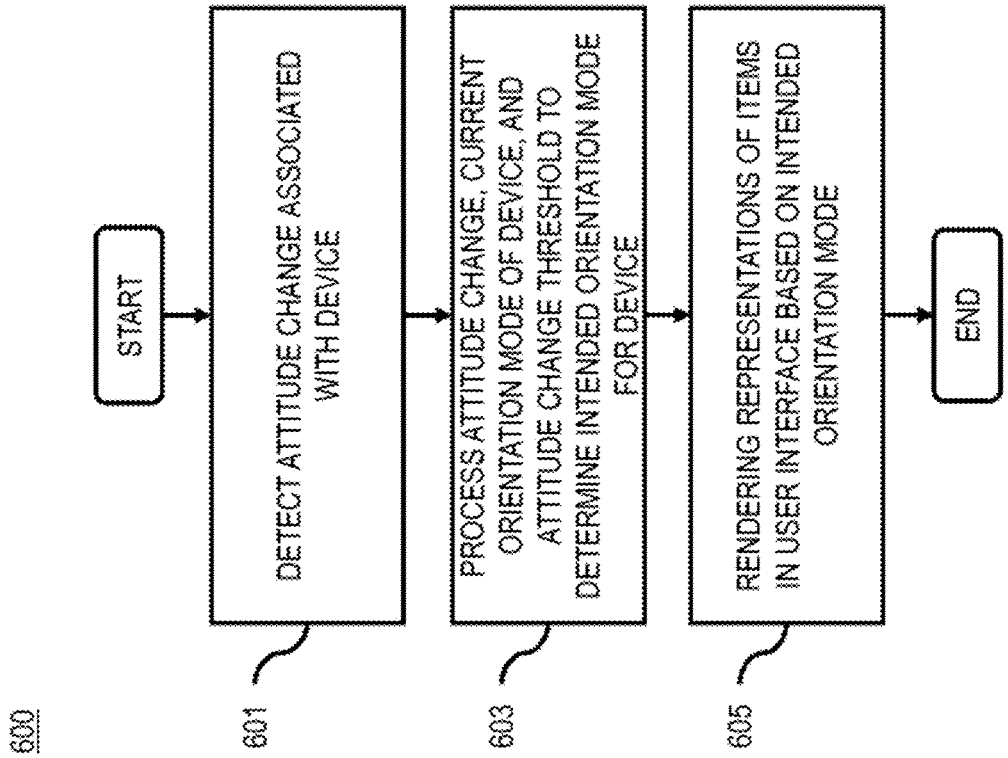
FIG. 6 is a flowchart of a process for rendering items on a user interface based on attitude change of a device, according to one example embodiment.

FIG. 6 is a flowchart of a process for rendering items on a user interface based on attitude change of a device, according to one example embodiment. In one embodiment, the map manager 109 performs the process 600 and is implemented in, for instance, a chip set including a processor and a memory as shown in FIG. 23. In step 601, the map manager 109 may determine to detect an attitude change associated with a device. By way of example, a movement of the yaw angle axis, the roll angle axis, or the pitch angle axis of the device from a device's immediately prior orientation (or from one or more predetermined orientations) may be detected.

In step 603, the map manager 109 may process and/or facilitate a processing of the attitude change associated with the device, a current orientation mode of the device, and an attitude change threshold to determine an intended orientation mode for the device. In step 605, the map manager 109 may cause, at least in part, a rendering of one or more representations of one or more items in a user interface based, at least in part, on the intended orientation mode. In one scenario, the device may currently be in a camera view mode when a roll (e.g., the attitude change) is detected for the device. Because a particular orientation mode (e.g., landscape mode) may be associated with the camera view mode, the map manager 109 may utilize the particular orientation mode (e.g., landscape) to estimate the orientation angles of the device prior to the attitude change and determine whether the attitude change from the estimated orientation angle satisfies the attitude change threshold to label the device as being in the flat mode. If, for instance, the attitude change threshold is satisfied, then the device will be labeled as being in flat mode, and the representations of the items may be rendered in a map viewing mode as a result of labeling of the device as being in the flat mode.

Tables 1 and 2 below respectively provide example pseudo code detailing view switching based on orientation estimation and example pseudo code detailing view switching using the motion sensors of a device (e.g., to detect the attitude change). It is noted that these approach may be combined to provide orientation estimation using the motion sensors of the device, which may then be used to determine the viewing mode (e.g., camera view mode, list view mode, map view mode, etc.)

TABLE 1

Pseudo code detailing the orientation estimation for view switching:

```
Approach 1:
  if ( CurrentPageWantsToSeeAttitudeChange &&
       PageTransition != true)
  Then
    NewUri = empty;
    If (NewZValue exceeds HorizontalThresholdValue &&
        CurrentPage != MapPageUri)
    Then
      Newuri = MapPageUri;
    Else if (NewYValue exceeds PortraitThesholdValue &&
        CurrentPage != ListPageUri)
    Then
      NewUri = ListPageUri;
    Else if (NewXValue exceeds LandscapeThresholdValue &&
        CurrentPage != ViewFinderUri)
    Then
      NewUri = ViewFinderPageUri;
    Endif
    If (NewUri not Empty)
    Then
      PageTransition = true;
      StartNavigationToNewUri;
    Endif
  Endif
```

TABLE 2

Pseudo code for view switching using motion sensor readings (arEngine):

```
If (viewMode == ViewMode.Camera)
  Camera & Map switch
      if (Math.Abs(arEngine.Roll) > 30)
        Enable cameraview
      else if (Math.Abs(arEngine.Roll) < 30)
        Enable MapView
  Else if (viewMode == ViewMode.List)
    Listview & Map switch
      if (Math.Abs(arEngine.Pitch) > 30)
        Enable listview
      else if (Math.Abs(arEngine.Pitch) < 30)
        Enable MapView
  Else if (viewMode == ViewMode.Map)
    Map & Listview/Camera switch
      if (Math.Abs(arEngine.Pitch) > 30)
        Enable listview
      else if (Math.Abs(arEngine.Roll) > 30)
        Enable cameraview
When each new page is navigated to, it marks itself as the currently
visible page and checks to see if it should empty the navigation stack:
MarkThisPageAsCurrentUri;
If (LoadedBecauseOfOrientationChange)
Then
  If (NavigationStackHasAPriorElement)
  Then
     RemovePriorNavigationStackElement;
  Endif
Endif
```

Figure 7:
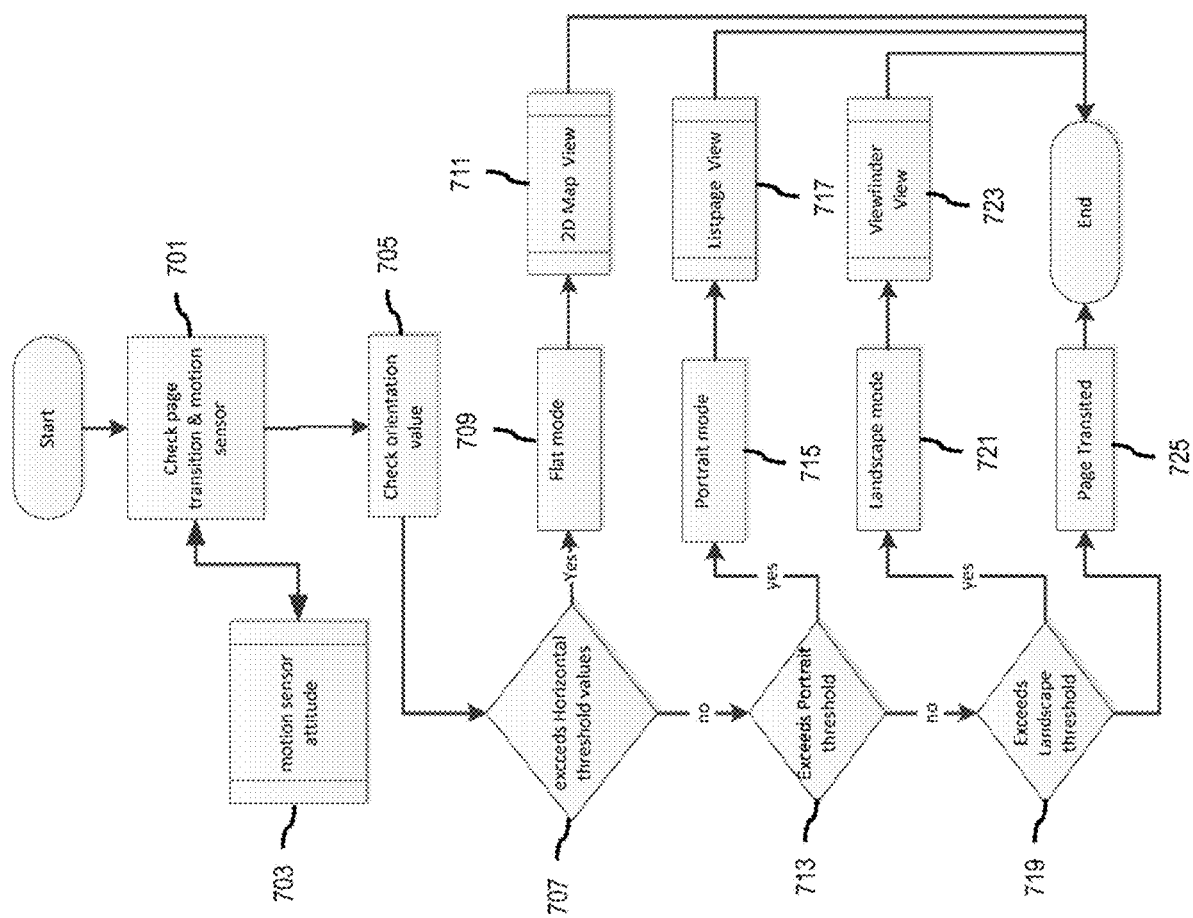
FIG. 7 is a flow chart for rendering items on a user interface using motion sensors, according to one example embodiment.

FIG. 7 is a flow chart for rendering items on a user interface using motion sensors, according to one example embodiment. As shown, in steps 701 and 703, a check for page transition and the attitude (or attitude change) of the device using the device's motion sensor is performed. In step 705, a check for the orientation value of the device (e.g., based on the motion sensor data) is performed. It is then determined, at step 707, whether the orientation value exceeds the horizontal threshold values. If, for instance, it is determined that the orientation value exceeds the horizontal threshold values, then the user interface of the device (or the device) is assigned the flat orientation mode (step 709) and the viewing mode for the user interface is modified to a map view (step 711). Otherwise, at step 713, it is determined whether the orientation value exceeds the portrait threshold values. If it is determined that the orientation value exceeds the portrait threshold values, then the user interface is assigned the portrait orientation mode (step 715) and the viewing mode for the user interface is modified to list view (step 717). Otherwise, at step 719, it is determined whether the orientation value exceeds the landscape threshold values. If it is determined that the orientation value exceeds the landscape threshold values, then the user interface is assigned the landscape orientation mode (step 721) and the viewing mode for the user interface is modified to a viewfinder (or camera) view (step 723). Otherwise, a page transition may occur without any modifications to the orientation mode or viewing mode of the user interface.

Figure 8:
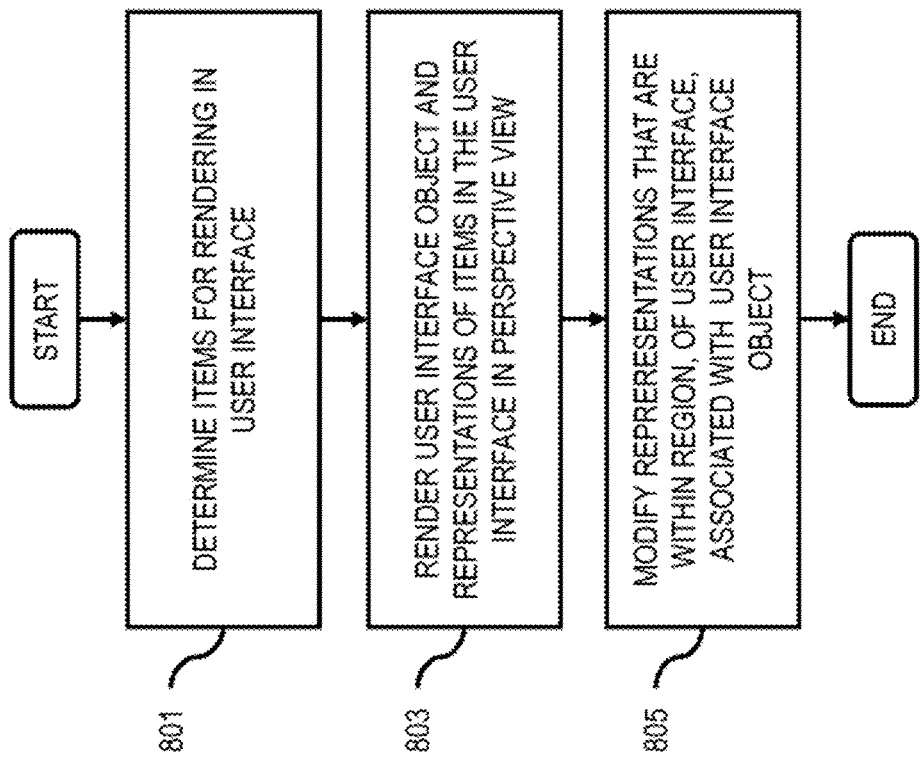
FIG. 8 is a flowchart of a process for modifying and rendering items within a region, of a user interface, associated with a user interface object, according to one example embodiment.

FIG. 8 is a flowchart of a process for modifying and rendering items within a region, of a user interface, associated with a user interface object, according to one example embodiment. In one embodiment, the map manager 109 performs the process 800 and is implemented in, for instance, a chip set including a processor and a memory as shown in FIG. 23. In step 801, the map manager 109 may determine one or more items for rendering in a user interface. The map manager 109 may then, at step 803, cause, at least in part, a rendering at least one user interface object and the one or more representations of the one or more items in the user interface in a perspective view (e.g., where the nearest POIs to the viewfinder of the device is rendered in a larger size, and the farthest POIs from the viewfinder is rendered in a smaller size).

In step 805, the map manager 109 may cause, at least in part, a modification of the one or more representations that are within a region, of the user interface, associated with the at least one user interface object. As noted, in some embodiments, the modification may include, at least in part, an enlargement of the one or more representations, presentation of additional information relating to associated items of the one or more representations, or a combination thereof. By way of example, the user interface object may be a representation of a magnifying glass (or lens) or a specific area or window on the user interface/viewfinder that is rendered as a layer over the POI representation layer. In one scenario, a user may moves the viewfinder of the device to a particular POI (e.g., in the real world) such that the POI representation is shifted from its previous position on the user interface to the region associated with the magnifying glass. The user interface object may positioned in a fix position on the user interface/viewfinder, for example, in the middle of the user interface/viewfinder or any other location of the user interface/viewfinder. Alternatively, the user may manually move the magnifying glass or area, e.g., by touching it, over the interesting items such as POIs. As a result, the POI representation may become enlarged or expanded to provide additional details about the particular POI. Additionally, the user may manually change the size of the user interface/viewfinder, for example, by touching and dragging the border area of the user interface/viewfinder. Alternatively, the size of the user interface/viewfinder may be determined automatically by the map manager 109 based on the density of the POIs on the user interface/viewfinder.

Figure 9:
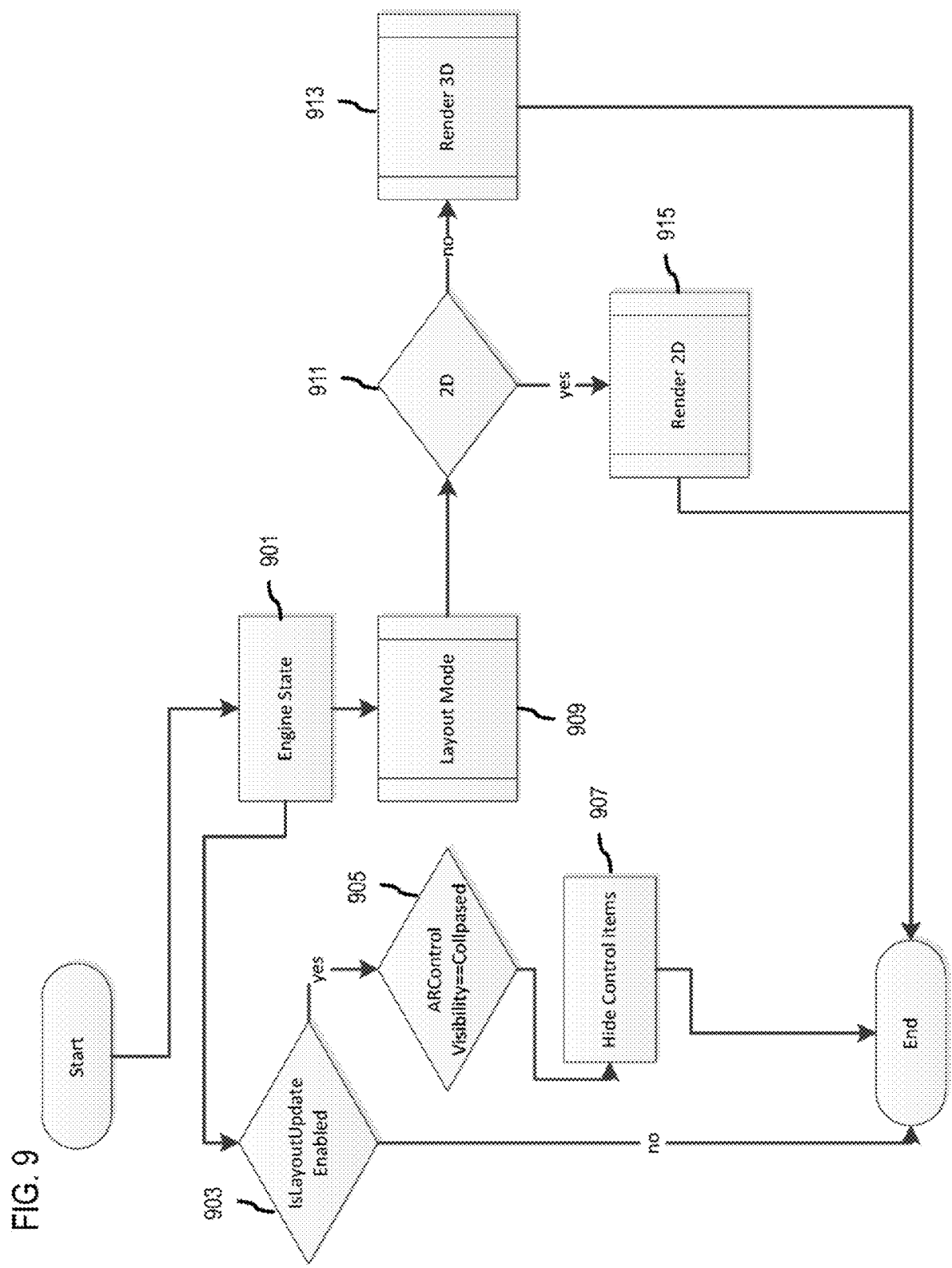
FIG. 9 is a flow chart for rendering items in an augmented reality display, according to one example embodiment.

FIG. 9 is a flow chart for rendering items in an augmented reality display, according to one example embodiment. As shown, in step 901, the map manager 109 may determine the augmented reality engine state. Upon satisfaction of the engine state, the map manager 109 may check the settings, for instance, in steps 903 and 905, to see if "LayoutUpdate" is enabled and if the "ARControl Visibility" is set to "collapsed." If it is determined that the visibility of the augmented reality controls are set to "collapsed," then the map manager 109 will hide the control items (step 907). The map manager 109 may also determine the layout mode (step 909) and then determine whether the augmented reality layout is supposed to be in 2D (step 911). If, for instance, the layout is not supposed to be in 2D (and thus in 3D), the map manager 109 will call the Render3D function (shown in FIG. 10A) (step 913). However, if the layout is supposed to be in 2D, the map manager 109 will call the Render2D function (shown in FIG. 14) (step 915).

Figure 10A:
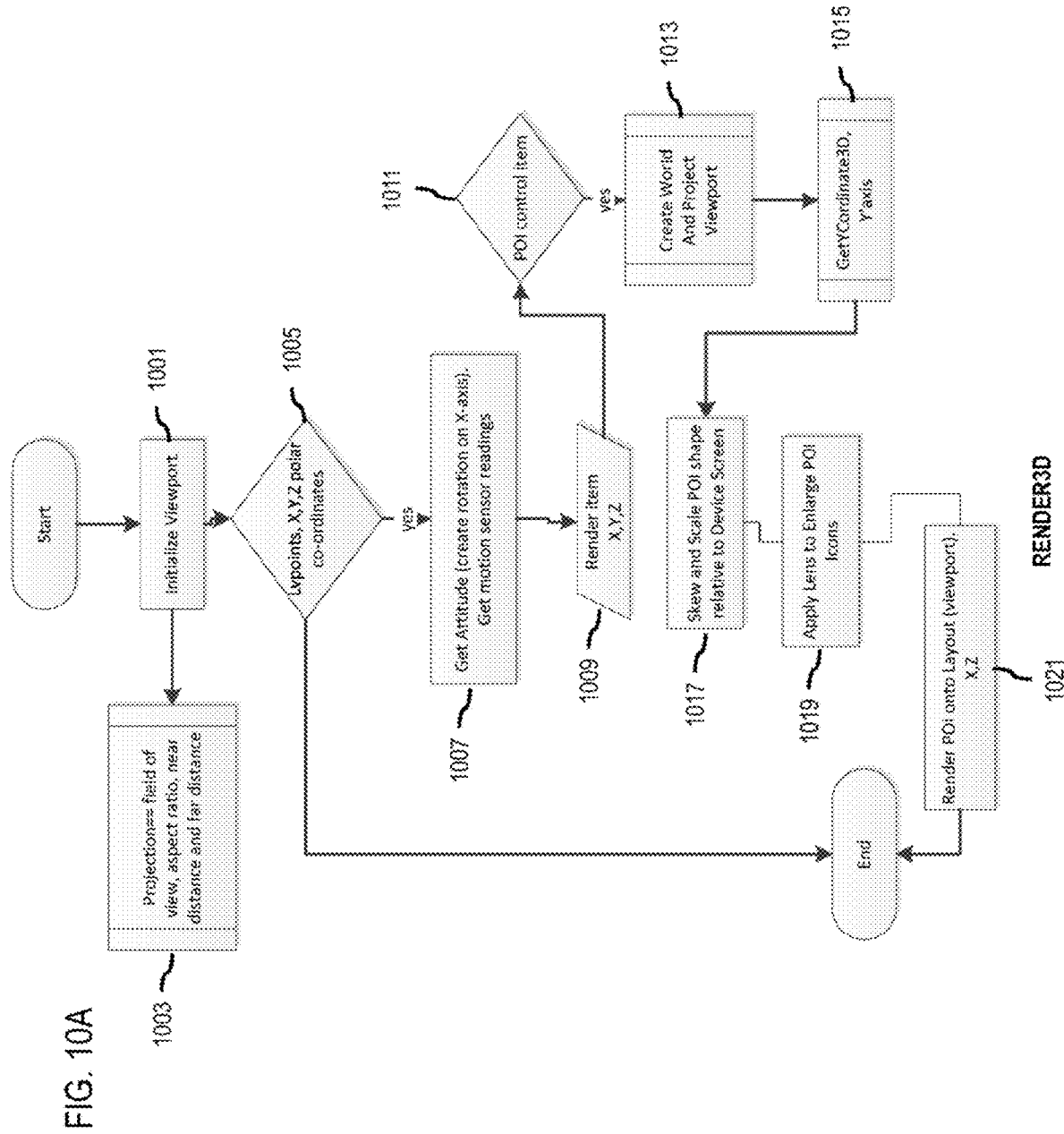
FIG. 10A is a flow chart for projecting POI items on a 3D layout, according to one example embodiment.

FIG. 10A is a flow chart for projecting POI items on a 3D layout, according to one example embodiment. As shown, the map manager 109 may first initialize the viewport (step 1001) to determine the projection, for instance, based on the field of view, aspect ratio, and the distances of the POIs from the viewfinder (step 1003). For example, the approach may determine the X, Y, Z coordinates of augmented reality items (e.g., POIs). In some embodiments, the Y coordinate is not projected and uses a different algorithm to vertically distribute the POI augmented reality items in the viewport. The Microsoft XNA framework, for instance, leverages the use of hardware GPU and OpenGL on windows phone. Microsoft XNA is originally designed for game studio applications because of the fast rendering capabilities. Based on this and the demand for computation, the augmented reality layout may utilize the Graphics framework "Microsoft XNA." As described in later sections, the map manager 109 may combine the use of the virtual cylindrical layout in 2D (e.g., where the relative locations of the POIs are transformed from latitude and longitude to polar coordinates relative to the mobile device) and uses the XNA (or any other 3D modeling space framework) viewport for projection and rendering of the augmented reality POI items using a motion sensor readings made up of any combination of the GPS, compass, gyroscope and accelerometer sensor fusion readings.

In step 1005, the map manager 109 may check the polar coordinates of the relative locations of the POIs. Upon determination of the polar coordinates, the map manager 109 may obtain the attitude of the device and the motion sensor readings (e.g., to determine attitude change) (step 1007). The map manager 109 will then determine to render the items (or the representations) based on their X, Y, Z coordinates (step 1009). If it is determined that one of the items is a POI control item, the map manager 109 may create a world and project viewport (steps 1011 and 1013).

Table 3 below provides examples of the various transformation matrixes that may be used to create the world and project viewport (as well as other viewports), for instance, in the XNA framework. It is noted that these matrices may work on a standard 3D coordinate system (e.g., the model space). For the purpose of illustration, the coordinates in the model space may be Xm, Ym, and Zm.

TABLE 3

XNA Matrix Space
Start vertices normally set [0,0,0] (X,Y,Z) as the Centre of your object with vertex positions defined relative to the Centre. These positions are defined in Model Space.
Position, rotate and scale the 3D model, and matrix that XNA can use to convert the vertex positions from model space into this new space may be known as World Space. This matrix is called the World Matrix
World Matrix - Transforms 3D data from Model Space into World Space. In some embodiments, the transformation may need to be calculated before rendering every entity of the World Space. In certain embodiments, the world needs to be transformed so it appears as if it is being viewed from a certain position in the real world. This position TABLE 3-continued is the location of the eye or camera. So a matrix is provided to enable XNA to convert World Space into View Space (e.g., sometimes known as camera space). This matrix is called the View Matrix
View Matrix - Transforms from World Space into View Space. In some embodiments, the transformation must be calculated each time the camera changes position.
Projection Matrix - Transforms from View Space into Screen Space. In some embodiments, the transformation is calculated and set just once during initialization.

Table 4 below provides example pseudo code for obtaining the Y coordinate in the 3D model space (e.g., Ym).

TABLE 4

GetYCordinate3D (Set the Y Band of the POI in the Hybrid layout)

Set gridHeight and rowHeight
    Compute gridRows by gridHeight / rowHeight;
    Compute cylinderHeight3D which is farDistance − nearDistance
        Get distanceY = distance − nearDistance
        Normalise distanceY by (gridHeight * (1.0 − distanceY / cylinderHeight2D));
    For Each rowIndex upt to gridRows
        If distanceY <= rowHeight
            Finds POI in GridRow
            Y = rowIndex * rowHeight
            Break loop
        Else
            Subtract distance value from rowHeight;
        If Y value is 0, returns the value
    Else
        Return the Y value
    End After determining to create the world and project viewport, the map manager 109 may call the function represented by the pseudo code in Table 4 to obtain the respective Y coordinates in the 3D model space (step 1015). The map manager 109 may then skew and scale the POI representation shapes relative to the device screen (step 1017). As mentioned, however, a user interface object (e.g., represented by a magnifying glass or lens) may be applied to enlarge or extend the POI representations, for instance, to provide addition details about the associated POIs. Thus, the map manager 109 may render the user interface object onto the user interface (step 1019). The map manager 109 may then render the POI representations onto the viewport based on their coordinates (step 1021).

Figure 10B:
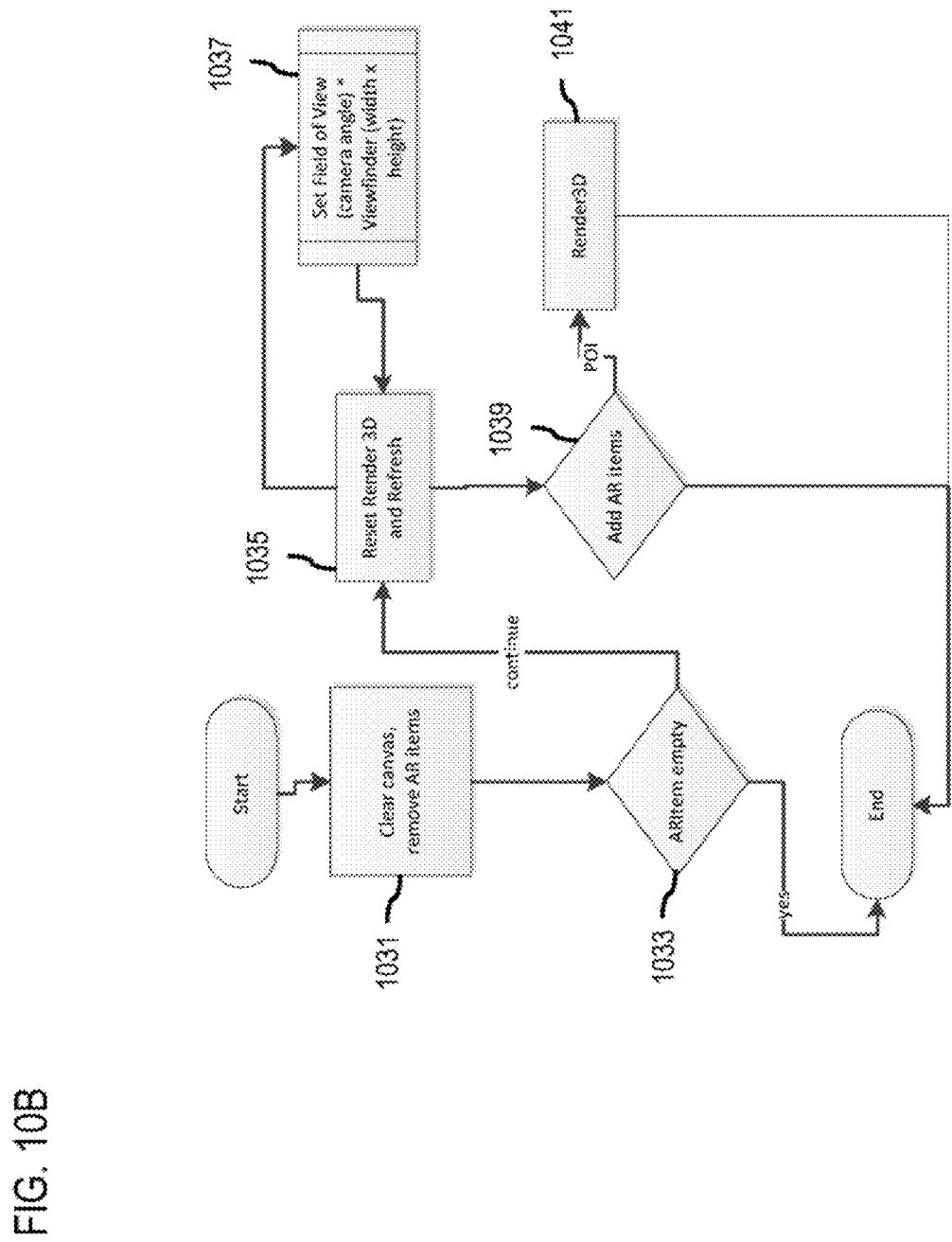
FIG. 10B is a flow chart for performing a refresh on a 3D layout, according to one example embodiment.

FIG. 10B is a flow chart for performing a refresh (e.g., XNA refresh) on a 3D layout, according to one example embodiment. As shown, in step 1031, the map manager 109 may clear the canvas and remove augmented reality items. After checking that the canvas is empty (step 1033), the map manager 109 may continue by initiating a reset of Render3D (e.g., shown in FIG. 10A) and refresh (step 1035). The field of view may then be set (step 1037). Additionally, the augmented reality items may be added on the canvas (step 1039). Thereafter, a new rendering of the POI items may be performed (step 1041).

Figure 11:
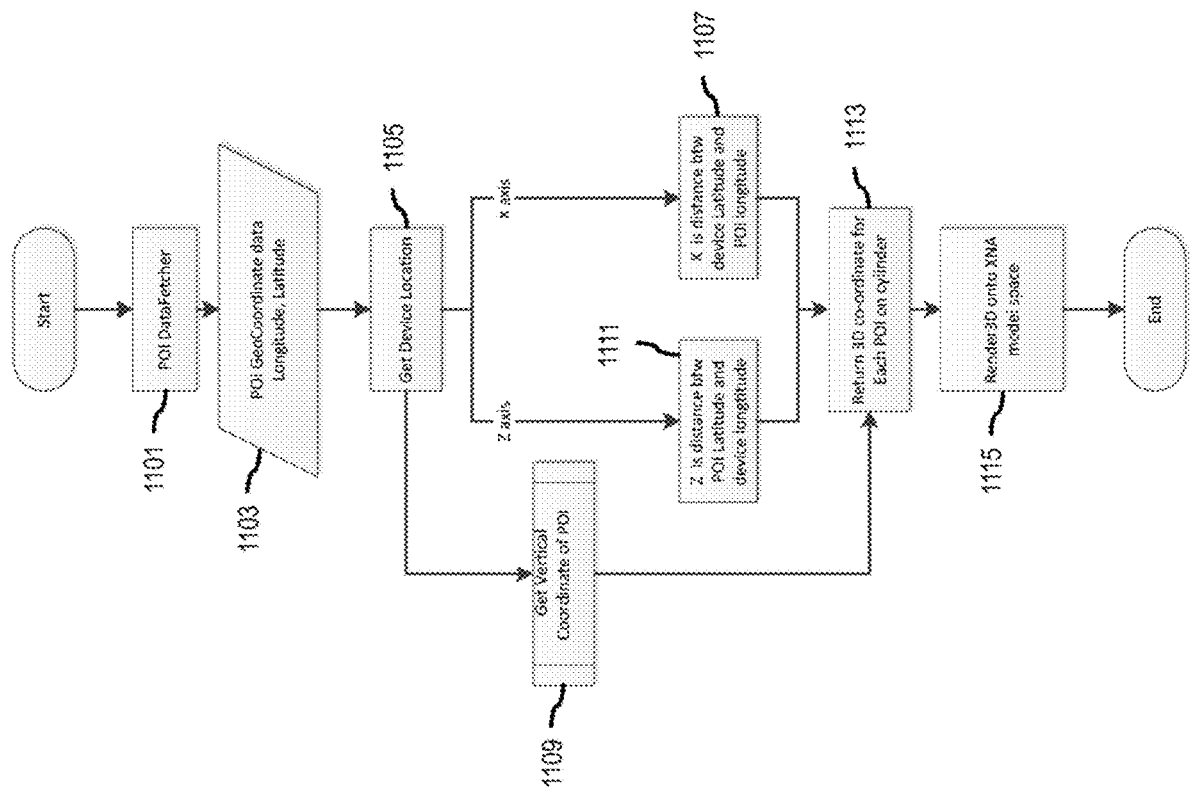
FIG. 11 is a flow chart for transforming the latitude and longitude coordinates of POIs to Cartesian coordinates for back projection on an XNA model space for a 3D layout, according to one example embodiment.

FIG. 11 is a flow chart for transforming the latitude and longitude coordinates of POIs to Cartesian coordinates for back projection on an XNA model space for a 3D layout, according to one example embodiment. As shown, in steps 1101 and 1103, the map manager 109 may fetch POI data and determine the geo-coordinates of the POIs (e.g., latitude and longitude coordinates). In step 1105, the map manager 109 obtains the location information for the device. Based on the location information and the geo-coordinates of the POIs, the map manager 109 may calculate the X, Y, Z coordinates (e.g., respectively in steps 1107, 1109, and 1111) for the 3D model space (e.g., XNA model space). The X, Y, Z coordinates are then returned for each POI on the cylinder (step 1113). The Render3D function is then called to perform the back projection onto the XNA model space (step 1115).

Figure 12A:
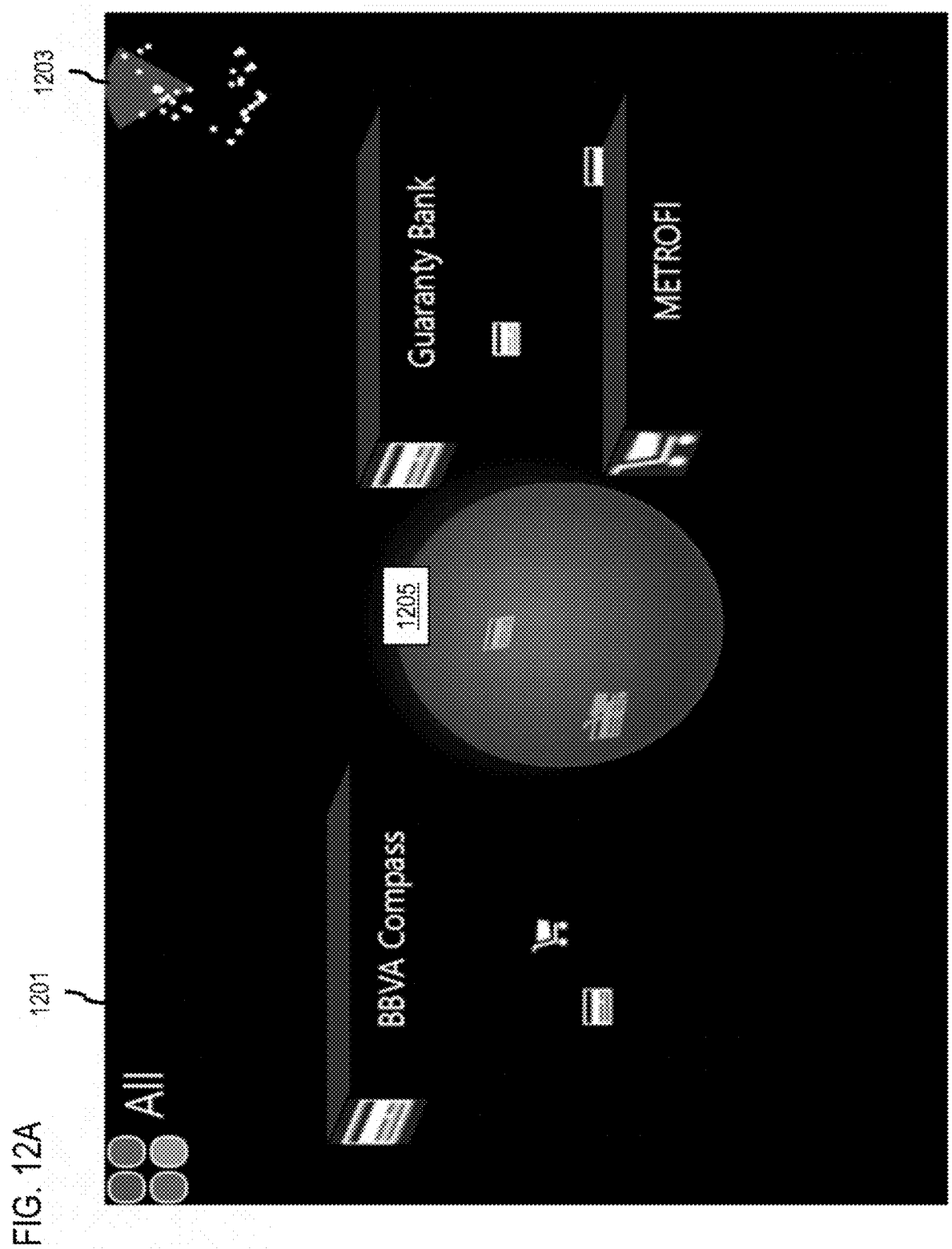
FIGS. 12A and 12B are diagrams of a user interface utilized in the processes of FIG. 8, according to various example embodiments.
Figure 12B:
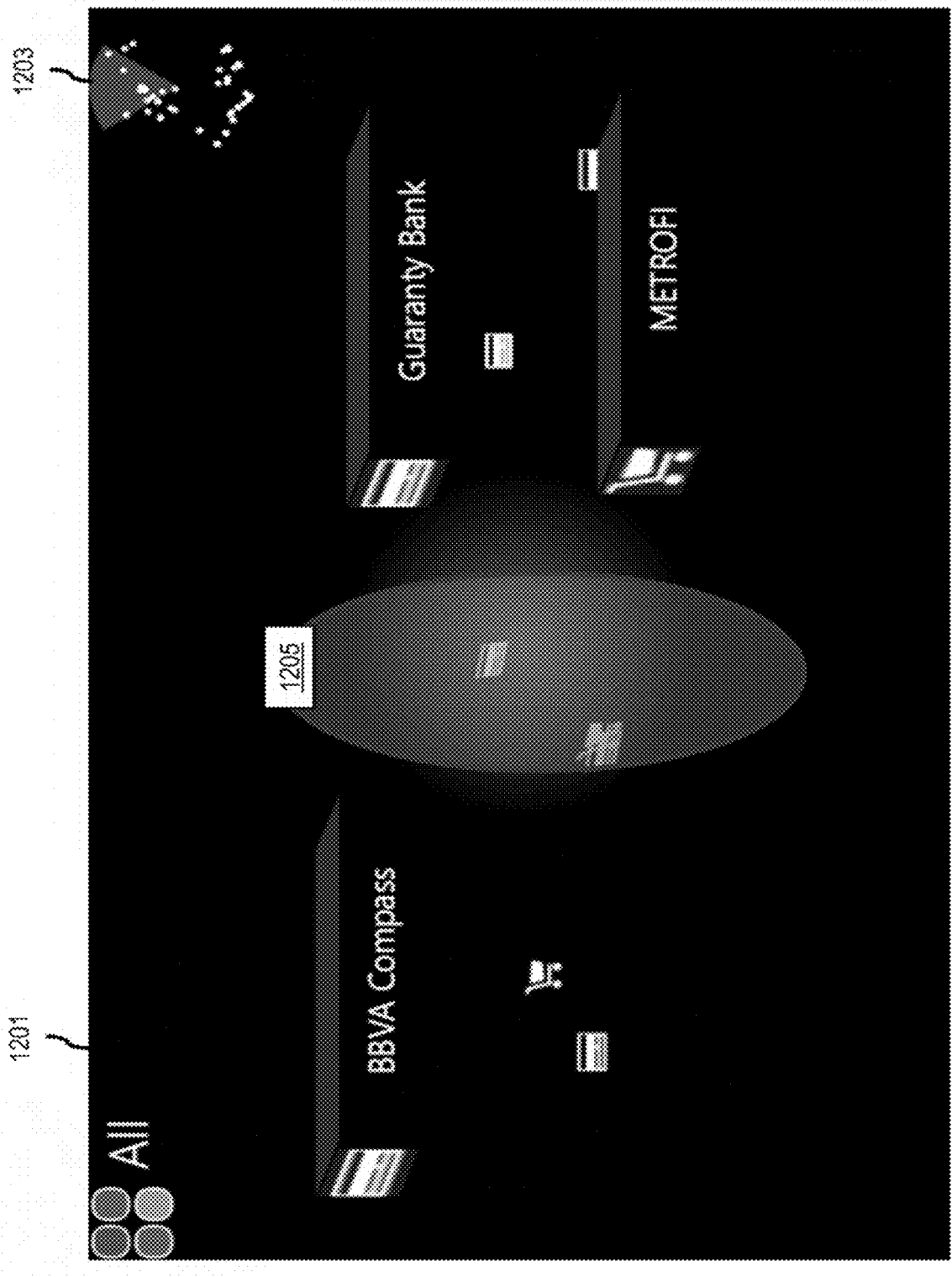

FIGS. 12A and 12B are diagrams of a user interface utilized in the processes of FIG. 8, according to various example embodiments. For example, FIG. 12A illustrates a user interface 1201 (e.g., for an augmented reality application), an indicator 1203, a user interface object 1205 (e.g., represented by a magnifying lens), and various POI representations of POIs captured by the viewfinder of the associated device. As shown, the POI representations may be rendered initially as small icons. However, as discussed, when the user moves the viewfinder of the device to a particular POI such that the POI representation for the particular POI is shifted to a region of the user interface 1201 associated with the user interface object 1205 (e.g., the region in which the user interface object is overlaid), the POI representation may become enlarged or expanded to provide better visibility or additional information. As illustrated, in this particular scenario, the POI representations may remain enlarged/expanded even after they move away from the region associated with the user interface object 1205. It is noted, however, that in other scenarios, the POI representations may return to their initial state once the POI representations are no longer within the region associated with the user interface object 1205. FIG. 12B also illustrates the user interface 1201, the indicator 1203, the user interface object 1205, and the various POI representations. In this scenario, the user has adjusted the size and the shape of the user interface object 1205. As mentioned, this adjustment of the user interface object 1205 may also modify the size and the shape of the region associated with the user interface object 1205.

Figure 13:
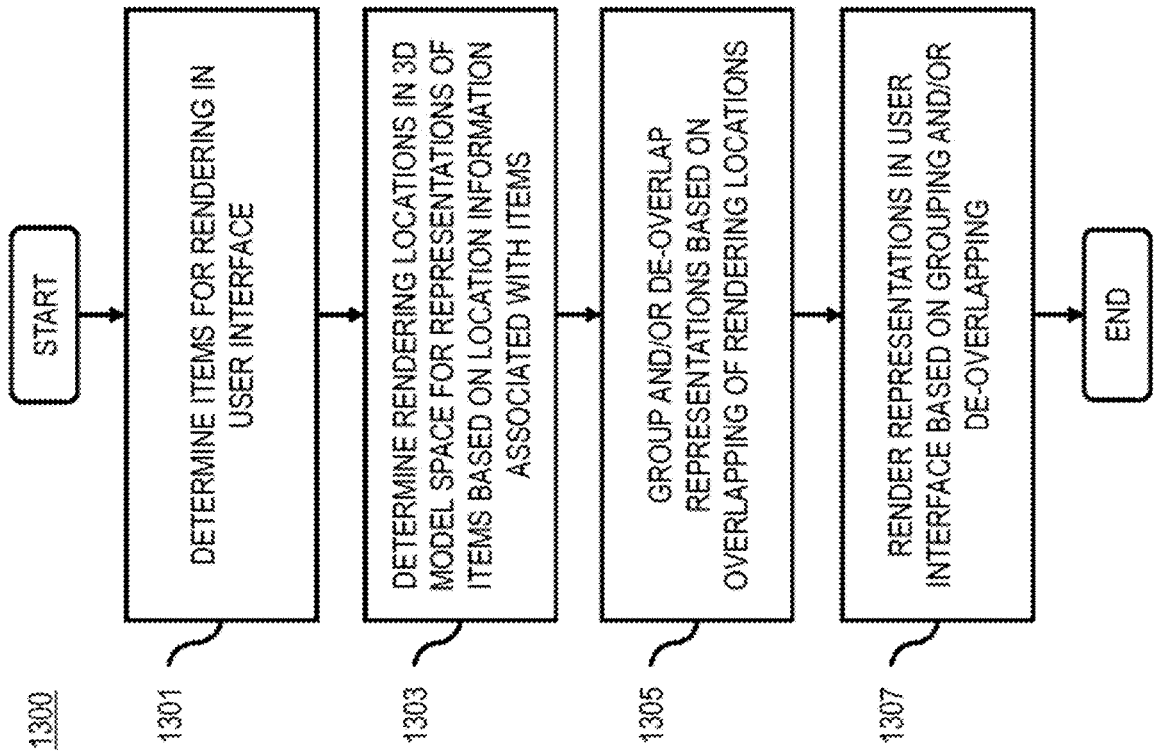
FIG. 13 is a flowchart of a process for rendering items in a user interface in a 3D model space, according to one example embodiment.

FIG. 13 is a flowchart of a process for rendering items in a user interface in a 3D model space, according to one example embodiment. In one embodiment, the map manager 109 performs the process 1300 and is implemented in, for instance, a chip set including a processor and a memory as shown in FIG. 23. In step 1301, the map manager 109 may determine one or more items for rendering in a user interface. By way of example, the items designated for rendering depends on the viewing perspective, field of view, preferences, etc., associated with POIs or items available for display in the perspective display.

The map manager 109 may then, at step 1303, cause, at least in part, a determination of one or more rendering locations in a three-dimensional model space for one or more representations of the one or more items based, at least in part, on location information associated with the one or more items. In one embodiment, the rendering locations are determined according to cell-based process (e.g., shown in FIGS. 19 and 20). In some embodiments, the rendering locations can also be mapped to pixel locations of the UE 101 (e.g., with a 640×480 pixel 4:3 display, a 854×480 pixel 16:9 display, etc.). These rendering locations, however, will be transformed for use in a 3D model space.

In step 1305, the map manager 109 may cause, at least in part, a grouping, a de-overlapping, or a combination thereof of the one or more representations based, at least in part, on an overlapping of the one or more rendering locations. For example, the map manager 109 can determine respective starting and ending points (e.g., or pixels) of each representation, and then apply one or more equations to determine whether the respective starting and/or ending points overlap. In one embodiment, the map manager 109 will attempt to separate or de-overlap close POI representations so that they do not overlap before determining whether to group the representations. In other words, the map manager 109 may group POI representations only if they cannot first be de-overlapped by, for instance, moving them to non-overlapping positions. In step 1307, the map manager 109 may cause, at least in part, a rendering of the one or more representations in the user interface based, at least in part, on the grouping, the de-overlapping, or a combination thereof.

Figure 14:
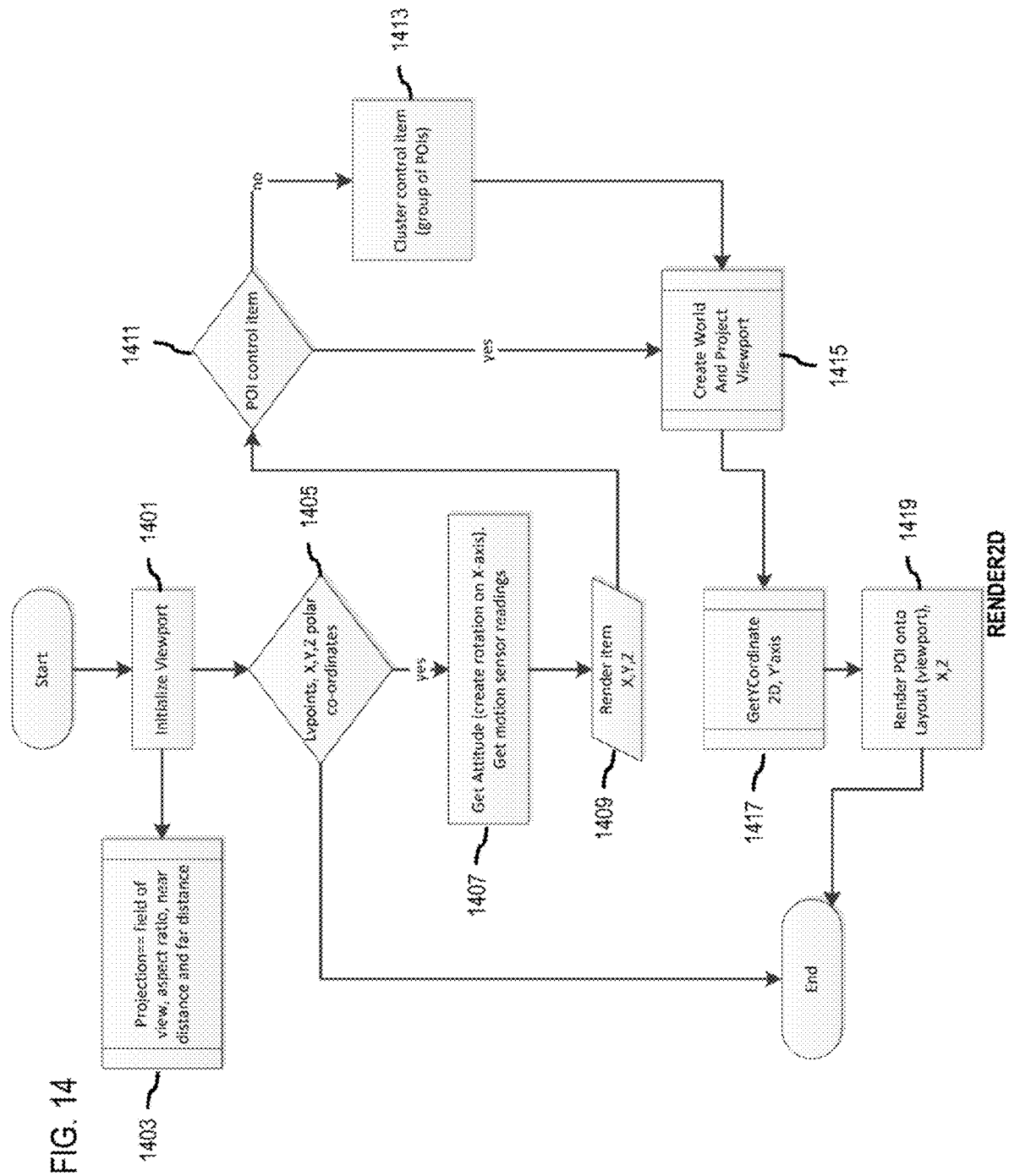
FIG. 14 is a flow chart for projecting POI items on a 2D layout, according to one example embodiment.

FIG. 14 is a flow chart for projecting POI items on a 2D layout, according to one example embodiment. As shown, the map manager 109 may first initialize the viewport (step 1401) to determine the projection, for instance, based on the field of view, aspect ratio, and the distances of the POIs from the viewfinder (step 1403). For example, the approach may determine the X, Y, Z coordinates of augmented reality items (e.g., POIs). As mentioned, in some embodiments, the map manager 109 may combine the use of the virtual cylindrical layout in 2D (e.g., where the relative locations of the POIs are transformed from latitude and longitude to polar coordinates relative to the mobile device) and uses the XNA (or any other 3D model space framework) viewport for projection and rendering of the augmented reality POI items using a motion sensor readings made up of any combination of the GPS, compass, gyroscope and accelerometer sensor fusion readings.

In step 1405, the map manager 109 may check the polar coordinates of the relative locations of the POIs. Upon determination of the polar coordinates, the map manager 109 may obtain the attitude of the device and the motion sensor readings (e.g., to determine attitude change) (step 1407). The map manager 109 will then determine to render the items (or the representations) based on their X, Y, Z coordinates (step 1409). If it is determined that clustering of POI control items is needed, the map manager 109 may first generate the necessary groupings (steps 1411 and 1413). The map manager 109 then creates a world and project viewport (step 1415).

As provided above, Table 3 provides examples of the various transformation matrixes that may be used to create the world and project viewport (as well as other viewports), for instance, in the XNA framework. It is noted that these matrices may work on a standard 3D coordinate system (e.g., the model space). For the purpose of illustration, the coordinates in the model space may be labeled as Xm, Ym, and Zm. The model space may use a cylinder that is scaled by a factor of distance, d*X and Z values (the horizontal plane) range and that lies on the circle described by the cylinder. The height ranges are based on the distance computed in meters and are placed in perspective height (see Table 9) below. By way of example, if the angle and height on the cylinder are Ac and Hc, then the following transforms may be used to convert the coordinates to coordinates of the model space: Xm=d*sin(Ac); Zm=d*cos(Ac); Ym=d*Hc.

In some embodiments, the differences between the 3D model space (e.g., XNA's rectangular 3-axis model space) and the 2D cylindrical model space may be as follows:
1. Heading in degrees in Xm-Zm axis. (See FIG. 16)
2. Projected height→based on distance in meters for Ym. (See Table 9)
3. Distance in X-Z plane=perspective height.

It is noted that the Y axis can be normalized to screen height to the camera view height using the algorithm represented by the pseudo code in Table 9. These needs to be mapped to the XNA viewport equivalent:
1. Heading in Radians in Xm-Zm axis.
2. Projected height→btw 0 and 480, Grid rows.

3. Distance in X-Z plane=1.

Tables 5-9 below provide example pseudo code for the functions, "PoiDeoverlapAndGroup," "GetXNAPOICoordinates," "MovePOIHorizontally," "MergePOIIntoGroup," and "GetYCordinate2D."

TABLE 5

PoiDeoverlapAndGroup

Assumes POIs are sorted by angle within band vertically; process them one band at a time.
    For each band, find index of the first and last POI (clockwise from North)
        Get Y band or position on vertical axis for FirstBandIndex
            Break loop if poiitems cluster id are not empty
        For each POI in the band, except the last
            Find its left and right POIs (the last POI is left of the first)
            If overlap
                If possible, move it left or right to deoverlap
                (MovePOIHorizontally)
                Otherwise group to the left or into the last POI
                (MergePOIIntoGroup)
End

TABLE 6

GetXNAPOICoordinates

Get distance to value
    Where d, distance is GetGeoDistance of device location lat/long to POI item lat/long
    0 thru 90, +N,+E (NE)
    90 thru 180, −N,+E (SE)
    180 thru 270, −N, +W (SW)
    270 thru 360, +N, +W (NW)
    Convert degrees to radians
    Compute X (horizontal coordinate) and Z vertical coordinate in line with North compass reading
        Where X = d*Sin (angle)
        And Z = d*Cos (angle)
    Return new X, Z coordinates
End

TABLE 7

MovePOIHorizontally

Get angle with North of POI
    If less than 0
        Add 360
    Else if more than 360
        Subtract 360
Get Angle with North in degrees
Set POI as deoverlap Index
Get new angle and convert for XNA projection
GetXNAPOICoordinates
    Set New POI X, Y coordinate
End

TABLE 8

MergePOIIntoGroup

If cluster contains key (unique string)
    Parent is already part of an existing cluster, just add the child to that cluster
    Get POI cluster Index
    Add cluster index to POI
Else
    Parent is not part of an existing cluster, create a new cluster
    Get POI cluster Angle with North
    Get POI cluster Geo location (x, y and Z)
    Get POI cluster distance based on first Parent POI Distance TABLE 8-continued MergePOIIntoGroup Add the parent POI to the new cluster
    Add the child POI to the new cluster
    Add the new cluster to the cluster-list
End

TABLE 9

GetYCordinate2D (Set the Y Band of the POI in the Hybrid layout)

Set gridHeight and rowHeight
Compute gridRows by gridHeight / rowHeight;
Compute cylinderHeight2D which is farDistance2D − nearDistance2D
    Get distanceY = distance − nearDistance2D
    Normalise distanceY by (gridHeight * (1.0 − distanceY / cylinderHeight2D));
For Each rowIndex upt to gridRows
    If distanceY <= rowHeight
        Finds POI in GridRow
        Y = rowIndex * rowHeight
        Break loop
    Else
        Subtract distance value from rowHeight;
    If Y value is 0, returns the value
    Else
        Return the Y value
End After determining to create the world and project viewport, the map manager 109 may call the function represented by the pseudo code in Table 9 to obtain the respective Y coordinates (step 1417). The map manager 109 may then render the POI representations onto the viewport based on their coordinates (step 1419).

Figure 15:
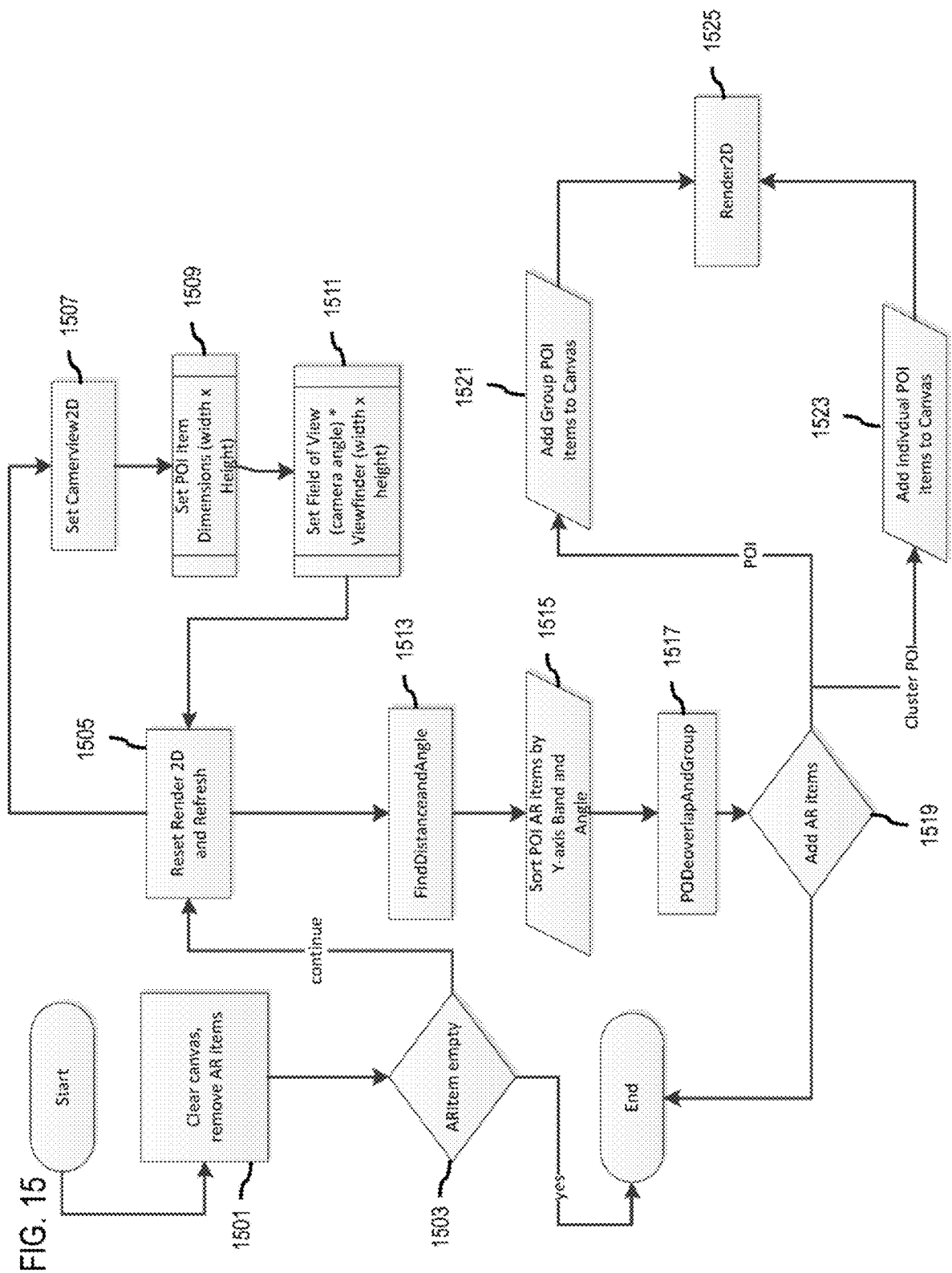
FIG. 15 is a flow chart for performing a refresh on a 2D layout, according to one example embodiment.

FIG. 15 is a flow chart for performing a refresh (e.g., XNA refresh) on a 2D layout, according to one example embodiment. As shown, in step 1501, the map manager 109 may clear the canvas and remove augmented reality items. After checking that the canvas is empty (step 1503), the map manager 109 may continue by initiating a reset of Render2D (e.g., shown in FIG. 14) and refresh (step 1505). For example, the camera view, the POI item dimensions (e.g., width x height), the field of view, etc., may be set (steps 1507, 1509, 1511). In addition, the distance and angle of the POI items (e.g., around the device) are determined (step 1513) and the POI items are sorted by Y-axis band and angle (step 1515). Next, in step 1517, the PoiDeoverlapAndGroup function in Table 5 may, for instance, be called to de-overlap and group the POI items. Then, in steps 1519, 1521, and 1523, the augmented reality items (e.g., both grouped POI items and individual POI items) are added to the canvas. As such, a new rendering of the POI items may be performed (step 1525).

Figure 16:
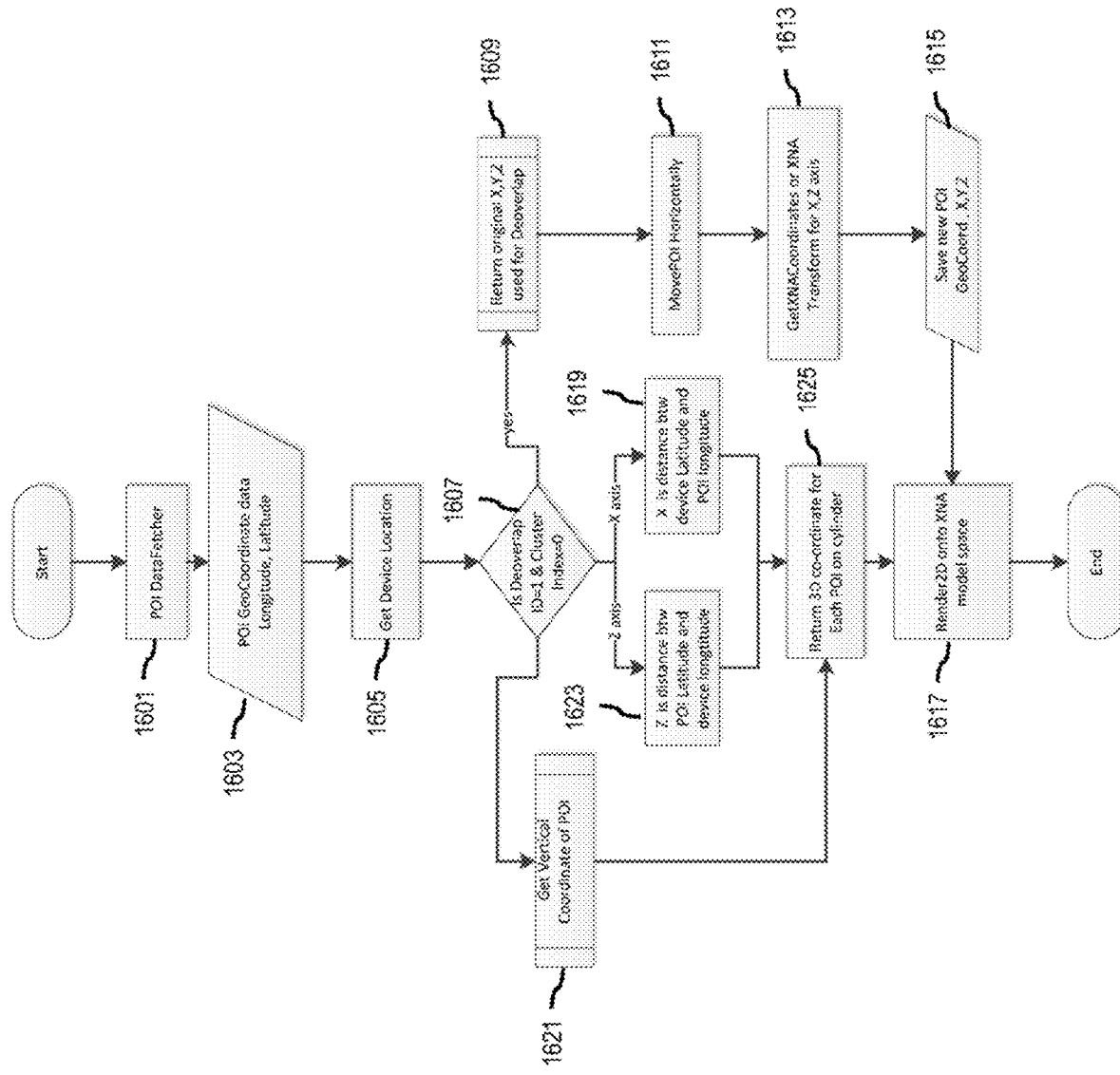
FIG. 16 is a flowchart for transforming POI item polar coordinates to Cartesian coordinates for back projection on an XNA model space for a 2D layout, according to one example embodiment.

FIG. 16 is a flowchart for transforming POI item polar coordinates to Cartesian coordinates for back projection on an XNA model space for a 2D layout, according to one example embodiment. As shown, in steps 1601 and 1603, the map manager 109 may fetch POI data and determine the geo-coordinates of the POIs (e.g., latitude and longitude coordinates). In step 1605, the map manager 109 obtains the location information for the device. If it is determined, at step 1607, that the de-overlap ID="1" and the cluster index="0," then the original X, Y, Z coordinates are used for the de-overlapping (step 1609). As such, in step 1611 and 1613, the MovePOIHorizontally function in Table 7 and the GetXNAPOICoordinates function of Table 6 are subsequently called to determine the new POI coordinates X, Y, Z. These coordinates are then saved (step 1615) and used when calling the Render2D function (shown in FIG. 14) for back projection onto the XNA model space (step 1617). Otherwise, the map manager 109 may calculate the X, Y, Z coordinates (e.g., respectively in steps 1619, 1621, and 1623) based on the location information and the geo-coordinates of the POIs. By way of example, the model space may use a cylinder that is scaled by a factor of distance, d*X and Z values (the horizontal plane) range and that lies on the circle described by the cylinder. The height ranges are based on the distance computed in meters and are placed in perspective height (see Table 9). If the angle and height on the cylinder are Ac and Hc, then the following transforms may be used to convert the polar coordinates (which are converted from the geo-coordinates of the POIs to place the POIs onto the cylinder) to coordinates of the model space: $Xm = d*\sin(Ac)$; $Zm = d*\cos(Ac)$; $Ym = d*Hc$. The X, Y, Z coordinates are then returned for each POI on the cylinder (step 1625). The Render2D function is then called to perform the back projection onto the XNA model space (step 1617).

Figure 17:
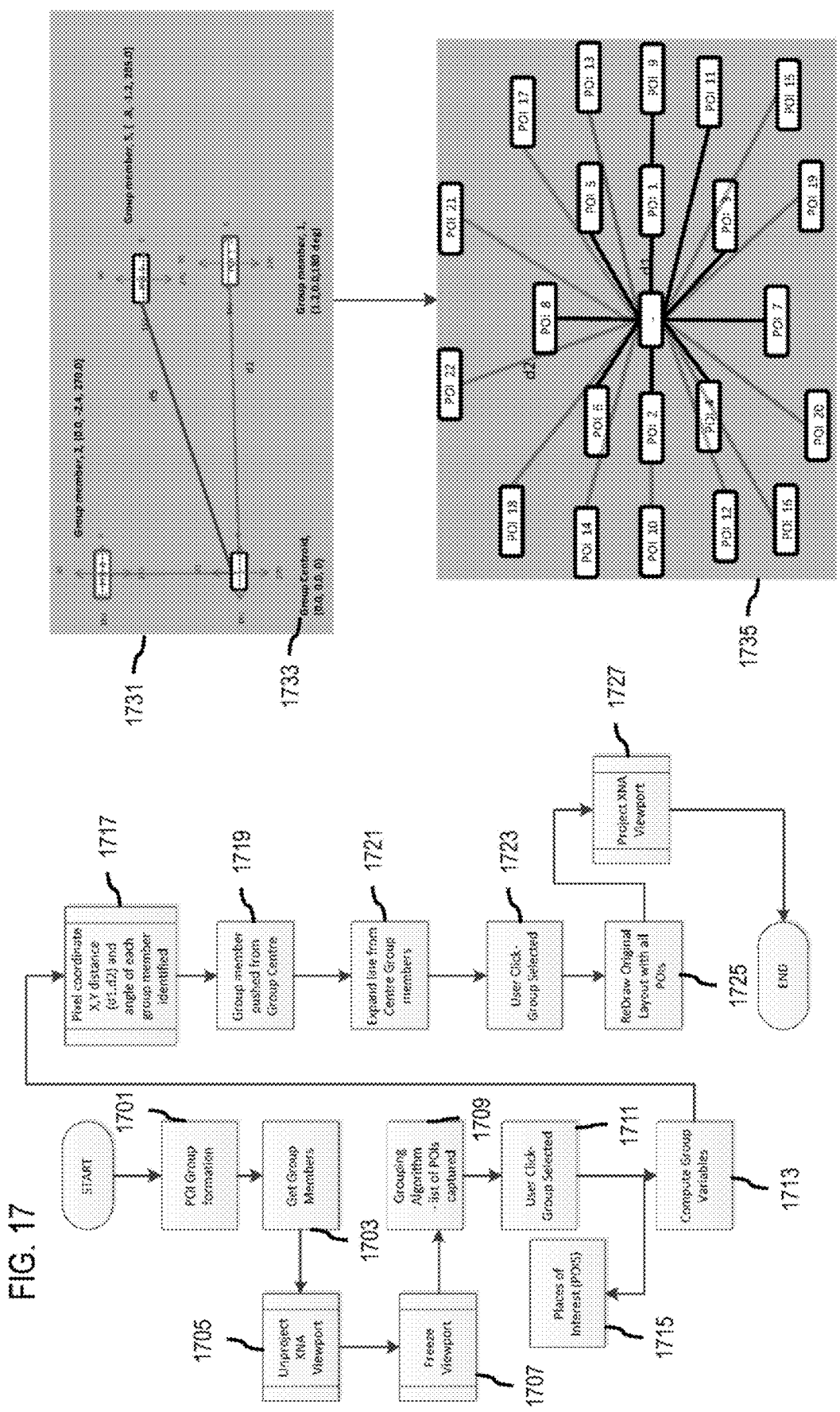
FIG. 17 illustrates a flowchart and diagrams of a grouping process, according to various example embodiments.

FIG. 17 illustrates a flowchart and diagrams of a grouping process, according to various example embodiments. As shown, POI groups are formed (step 1701), and the group members are identified and obtained (step 1703). The XNA viewport is first unprojected (step 1705) and then frozen (step 1707). A grouping algorithm is then performed (step 1709), for instance, based on the formed groups and group members. As such, some of the POIs may be grouped while other POIs will continue to be represented by individual POI representations. When a user selection of a group is detected (step 1711). As illustrated in steps 1713, 1715, and 1717, group variables are then computed to describe the position of the respective POI representation in terms of line and angular drawing: e.g., x, y, distance (d) and angle (phase). In some embodiments, the distance d1 (e.g., corresponding to distance in the x direction) and d2 (e.g., corresponding to distance in the y direction), where distance (d) (e.g., corresponding to a distance between the group centre and the group members POI 1 and POI 2, respectively) can be normalized to reflect actual distance in the real world. The group members are then pushed from the group centre and a line is expanded from the centre group members (steps 1719 and 1721). Another user selection of the group is detected (step 1723), and thus, the original layout with all the POIs is redrawn and projected on the XNA viewport (steps 1725 and 1727).

As shown in user interface 1731, when a user selects to expand a POI grouping as described above, the map manager 109 expands the group in to a group centroid 1733 and the individual group members (e.g., POIs 1-22). In one embodiment, the group members expand into concentric circles based on the number of group members, the available display area, and the like. For example, on a typical mobile device, the map manager 109 may provide for at least two concentric circles (e.g., circle 1 with a max of 8 POI representations, and circle 2 with a max of 14 POI representations).

As discussed, in one embodiment, the map manager 109 computes group variables to describe the position of the respective POI representation in terms of line and angular drawing: e.g., x, y, distance (d) and angle (phase). In some embodiments, the distance d1 (e.g., corresponding to distance in the x direction) and d2 (e.g., corresponding to distance in the y direction), where distance (d) (e.g., corresponding to a distance between the group centroid 1733 and the group members POI 1 and POI 2 respectively) can be normalized to reflect actual distance in the real world. In addition, the example of FIG. 17 is shown using a pixel-coordinate system and angular direction to draw a line from the center of the group member to the group centroid 1733. By way of example, the distance among the group members and/or the group centroid 1733 can be deduced using the x, y coordinates using, for instance, the Pythagorean Theorem to determine the plane geometry while drawing the line intersection. In one embodiment, the line intersection can be pre-computed using a table of angles to reduce resources and improve performance. The calculated distances and phases can be used to render the expanded POI representations as shown in the user interface 1735.

Figure 18:
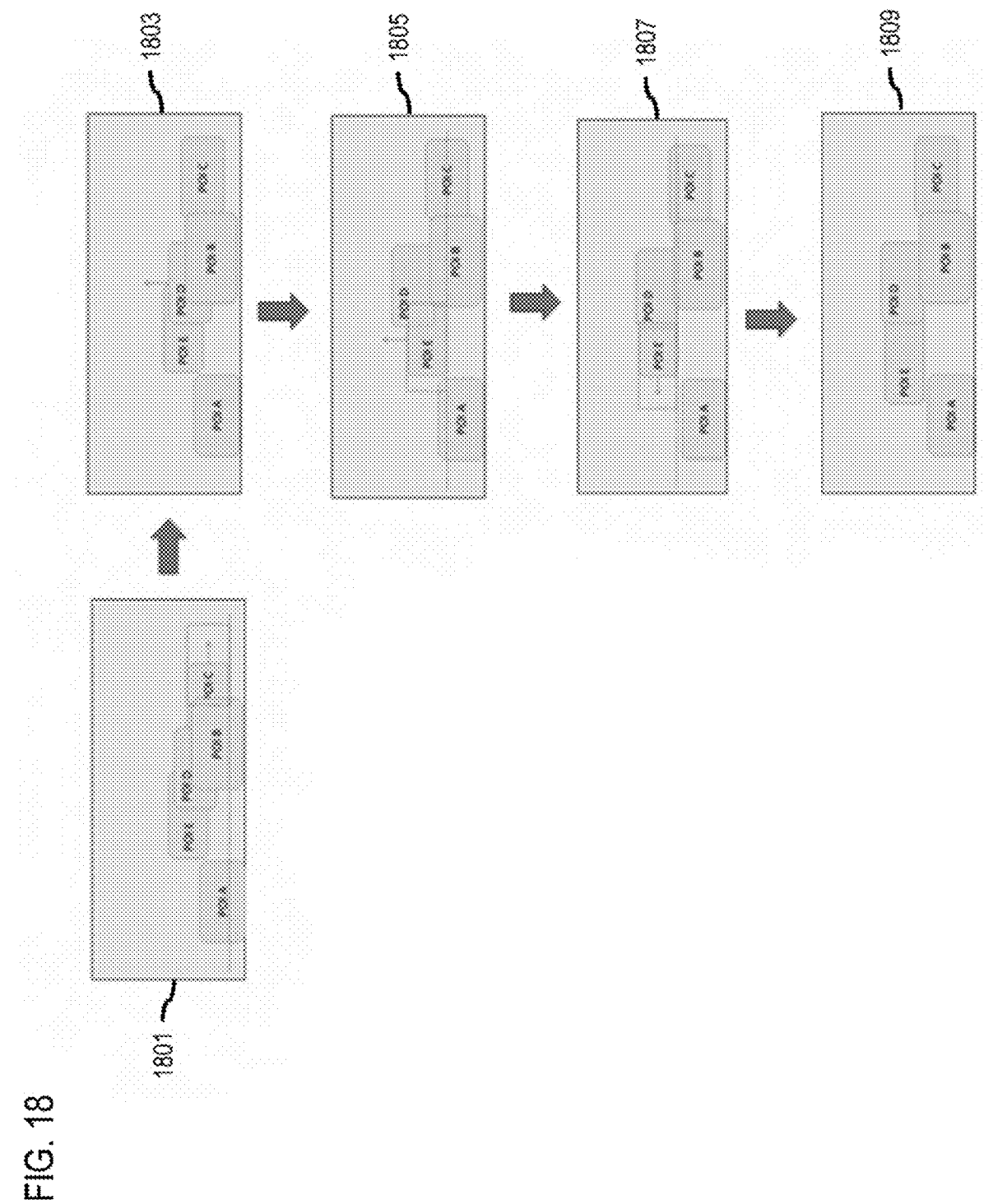
FIG. 18 illustrates diagrams depicting a global de-overlapping approach, according to various example embodiments.

FIG. 18 illustrates diagrams depicting a global de-overlapping approach, according to various example embodiments. As shown, UI 1801 presents a perspective display with POI representations that have not yet been de-overlapped. In this example, the map manager 109 selects POI B as the closest POI representation against which to process subsequent POI representations. The next closest POI representation is POI C. The map manager 109 determines that the direction of least overlap is to the right and moves the rendering location of POI C to right to reduce the overlap with POI B as shown in UI 1803.

Also shown in UI 1803, the map manager 109 then selects the POI D as the next farthest POI representation and determines that the region of least overlap with POI B is up, and moves the rendering location of POI D up to reduce the overlap with POI B resulting in UI 1805. The next POI representation, POI E, is a more complex situation in which POI E overlaps with both POI B and POI D. The system first analyzes the overlap of POI E with POI B, the closest POI representation, and determines that to reduce its overlap with POI B, the rendering location of POI E should be moved up as shown in UI 1807.

In this position, POI E still substantially overlaps with POI D. Accordingly, the map manager 109 determines the direction of least overlap as left and moves the rendering location of POI E to the left to reduce the overlap. In this position, as shown in UI 1809, the POIs A-D are now substantially de-overlapped to improved their visibility and accessibility by the user.

Figure 19:
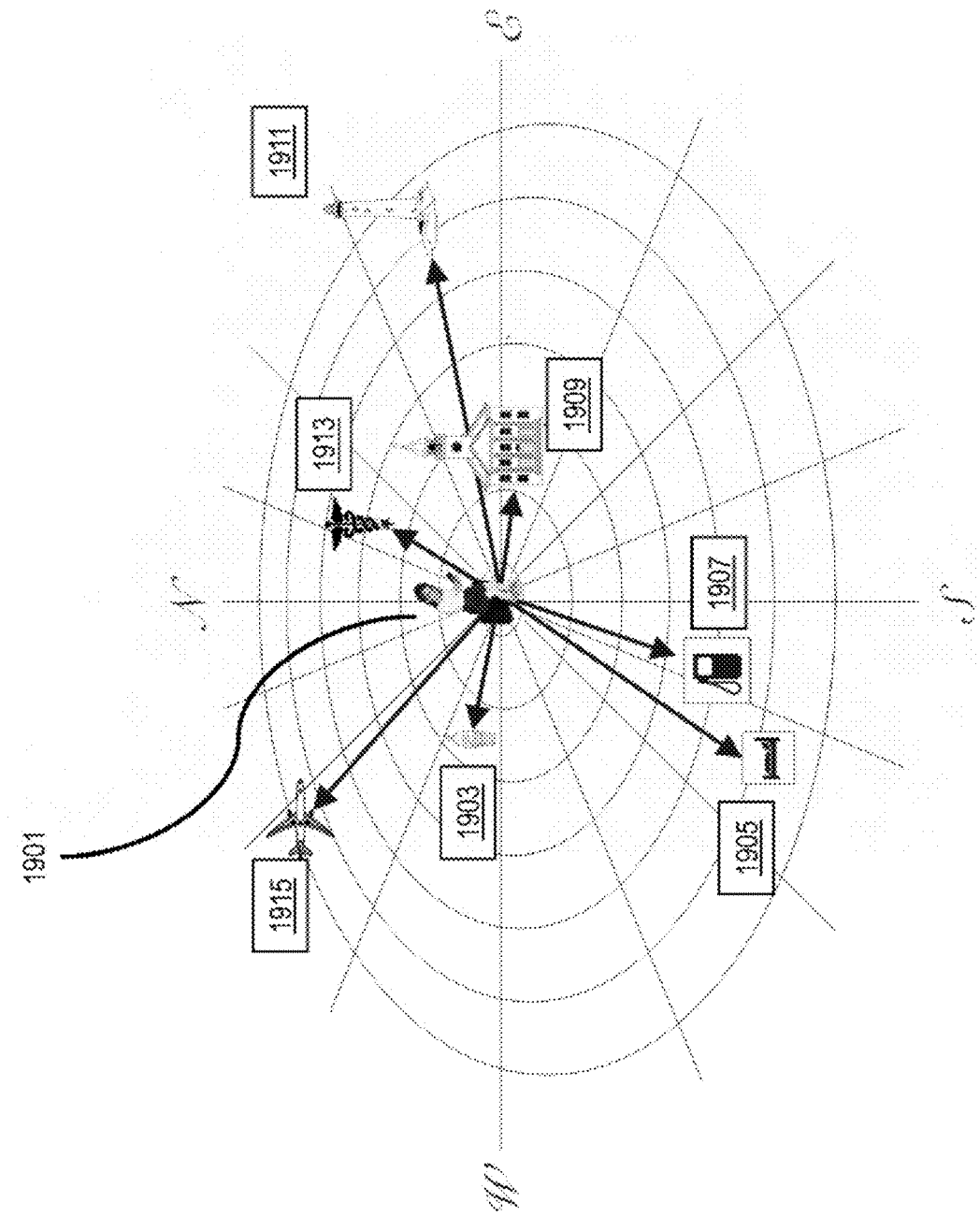
FIG. 19 is a diagram illustrating processing of location information into polar coordinates to support generating a perspective display, according to one example embodiment.

FIG. 19 is a diagram illustrating processing of location information into polar coordinates to support generating a perspective display, according to one embodiment. In one example embodiment, the map manager 109 converts POI location information into polar coordinates to facilitate mapping onto a surface for representing the POIs. For example if the surface is a cylinder, sphere, or other like object, polar coordinates can more easily specify positions of the mapped representations.

Accordingly, in one embodiment, both the location of the devices and those of the points of interest are given in spherical coordinates measured in degrees of latitude and longitude. The first step is to convert the locations of the points of interest to polar coordinates with the device or viewing location at the center and north from the device as the 0 angle. It is noted that this algorithm assumes that the device is not located near one of the Earth's poles. In one embodiment, an equirectangular projection of latitude and longitude can be used during this conversion to avoid the expense of computations in spherical geometry. This allows the Pythagorean Theorem from plane geometry to be used for distance and standard trigonometry to be used for the angle. As shown, a user 1901 with a mobile device (e.g., a UE 101) is surrounded by various POIs 1903-1915. The respective bold arrows represent the angle and distance to each POI in the polar coordinate system. The cardinal directions (e.g., North, East, South, and West) are also displayed for reference.

Figure 20:
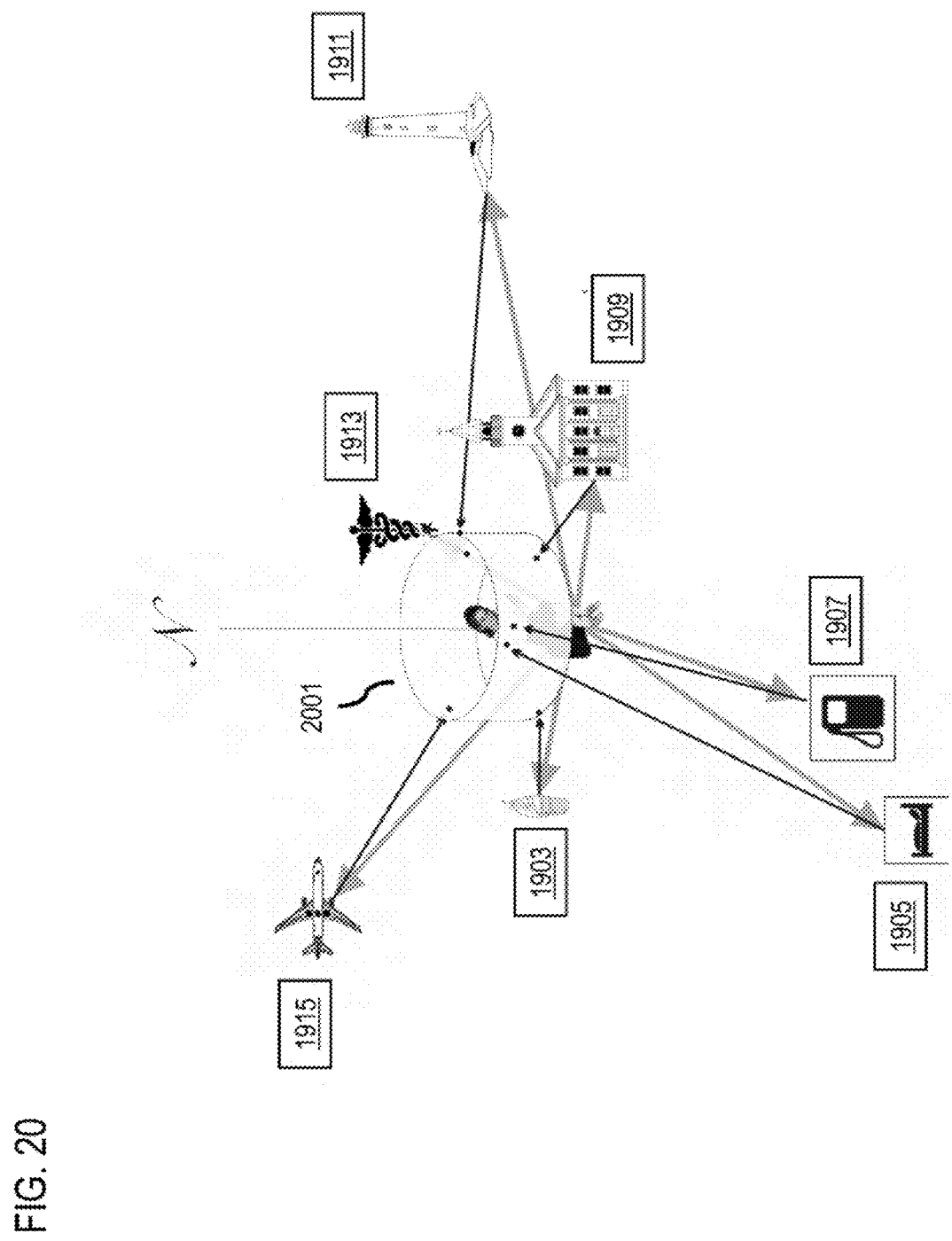
FIG. 20 is a diagram illustrating a process for projecting representations of location items on a surface for generating a perspective display, according to one example embodiment.

FIG. 20 is a diagram illustrating a process for projecting representations of location items on a surface for generating a perspective display, according to one example embodiment. In this example, the surface is a virtual cylinder 2001. By way of example, the virtual cylinder 2001 is a finite, 2D space represented by pairs of real numbers. One dimension is vertical and the other is horizontal. In one embodiment, for the perspective projection, the vertical dimension does not need any particular unit of measure so the cylinder is simply given a height of 1.0. The horizontal dimension is in degrees measured from north. The POIs 1903-1915 can then be mapped or projected onto the cylinder 2001.

With respect to the projection, the polar angle is also the angle for the cylindrical projection. The polar distance is also converted to a perspective height. In one environment, using an artistic perspective, the horizon can be located above the top of the cylinder such that the farthest point of interest (e.g., POI 1911) is at the top of the cylinder (coordinate 1.0). The bottom of the cylinder (coordinate 0.0) can be the location of the nearest point of interest (e.g., POI 1903). In certain embodiments, several different simplifications are possible to avoid or otherwise reduce the computational expense of generating a display from a pure artistic perspective. For example, the log function provides an inexpensive foreshortening of distance with accuracy generally adequate for this problem. As shown in FIG. 20, the lighthouse (POI 1911) is the most distant point of interest from the device and is projected to the top of the cylinder. The ice cream shop (POI 1903) is the closest point of interest to the device and is projected to the bottom of the cylinder. Alternatively, if altitude information is available for the POIs, then the altitude information (rather than distance from the viewing location) can be used to determine the projected heights or POIs 1903-1915.

Figure 21:
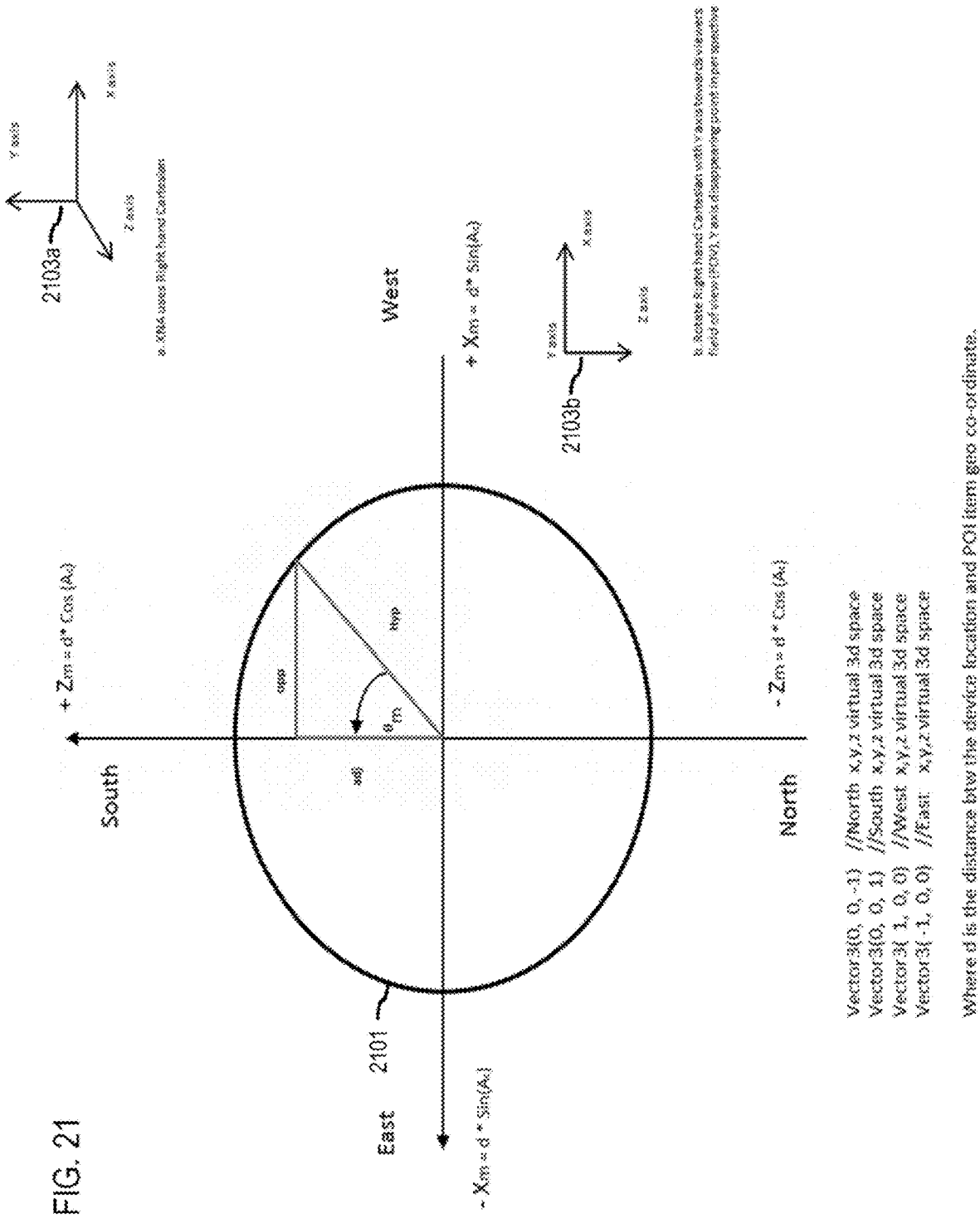
FIG. 21 is a diagram illustrating a screen mapping using conversion from a 3D model space to a 2D layout, according to one example embodiment.

FIG. 21 is a diagram illustrating a screen mapping using conversion from a 3D model space to a 2D layout, according to one example embodiment. By way of example, the diagram includes a cylinder 2101 from a top-view and a coordinate axes 2103 for the 3D model space (e.g., right-handed Cartesian as used in XNA). Coordinate axes 2103a is shown viewed from an angle, while coordinate axes 2103b shows the coordinate axes 2103a rotated for a view from the top. Thus, the Y-axis seemingly disappears from this point in perspective.

The processes described herein for rendering items in a user interface in a prospective manner may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 22:
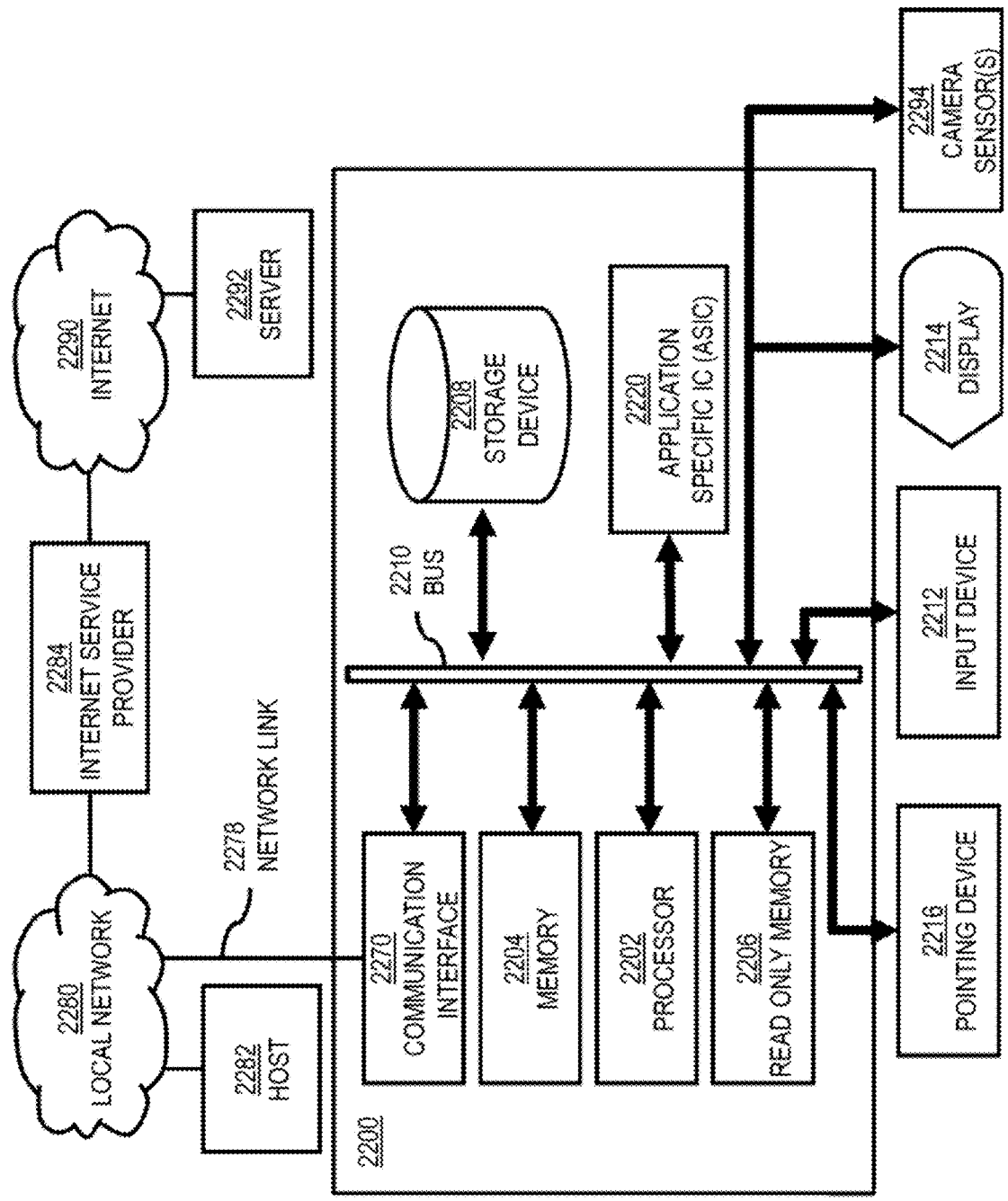
FIG. 22 is a diagram of hardware that can be used to implement the example embodiments of the invention.

FIG. 22 illustrates a computer system 2200 upon which the example embodiments of the invention may be implemented in any combinations complementing each other. Although computer system 2200 is depicted with respect to a particular device or equipment, it is contemplated that other devices or equipment (e.g., network elements, servers, etc.) within FIG. 22 can deploy the illustrated hardware and components of system 2200. Computer system 2200 is programmed (e.g., via computer program code or instructions) to render items in a user interface as described herein and includes a communication mechanism such as a bus 2210 for passing information between other internal and external components of the computer system 2200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 2200, or a portion thereof, constitutes a means for performing one or more steps of rendering items in a user interface.

A bus 2210 includes one or more parallel conductors of information so that information is transferred quickly among devices coupled to the bus 2210. One or more processors 2202 for processing information are coupled with the bus 2210.

A processor (or multiple processors) 2202 performs a set of operations on information as specified by computer program code related to rendering items in a user interface. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 2210 and placing information on the bus 2210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 2202, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 2200 also includes a memory 2204 coupled to bus 2210. The memory 2204, such as a random access memory (RAM) or any other dynamic storage device, stores information including processor instructions for rendering items in a user interface. Dynamic memory allows information stored therein to be changed by the computer system 2200. RAM allows a unit of information stored at a location called a memory address to be stored and retrieved independently of information at neighboring addresses. The memory 2204 is also used by the processor 2202 to store temporary values during execution of processor instructions. The computer system 2200 also includes a read only memory (ROM) 2206 or any other static storage device coupled to the bus 2210 for storing static information, including instructions, that is not changed by the computer system 2200. Some memory is composed of volatile storage that loses the information stored thereon when power is lost. Also coupled to bus 2210 is a non-volatile (persistent) storage device 2208, such as a magnetic disk, optical disk or flash card, for storing information, including instructions, that persists even when the computer system 2200 is turned off or otherwise loses power.

Information, including instructions for rendering items in a user interface, is provided to the bus 2210 for use by the processor from an external input device 2212, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 2200. Other external devices coupled to bus 2210, used primarily for interacting with humans, include a display device 2214, such as a cathode ray tube (CRT), a liquid crystal display (LCD), a light emitting diode (LED) display, an organic LED (OLED) display, a plasma screen, or a printer for presenting text or images, and a pointing device 2216, such as a mouse, a trackball, cursor direction keys, or a motion sensor, for controlling a position of a small cursor image presented on the display 2214 and issuing commands associated with graphical elements presented on the display 2214, and one or more camera sensors 2294 for capturing, recording and causing to store one or more still and/or moving images (e.g., videos, movies, etc.) which also may comprise audio recordings. In some embodiments, for example, in embodiments in which the computer system 2200 performs all functions automatically without human input, one or more of external input device 2212, display device 2214 and pointing device 2216 may be omitted.

In the illustrated embodiment, special purpose hardware, such as an application specific integrated circuit (ASIC) 2220, is coupled to bus 2210. The special purpose hardware is configured to perform operations not performed by processor 2202 quickly enough for special purposes. Examples of ASICs include graphics accelerator cards for generating images for display 2214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 2200 also includes one or more instances of a communications interface 2270 coupled to bus 2210. Communication interface 2270 provides a one-way or two-way communication coupling to a variety of external devices that operate with their own processors, such as printers, scanners and external disks. In general the coupling is with a network link 2278 that is connected to a local network 2280 to which a variety of external devices with their own processors are connected. For example, communication interface 2270 may be a parallel port or a serial port or a universal serial bus (USB) port on a personal computer. In some embodiments, communications interface 2270 is an integrated services digital network (ISDN) card or a digital subscriber line (DSL) card or a telephone modem that provides an information communication connection to a corresponding type of telephone line. In some embodiments, a communication interface 2270 is a cable modem that converts signals on bus 2210 into signals for a communication connection over a coaxial cable or into optical signals for a communication connection over a fiber optic cable. As another example, communications interface 2270 may be a local area network (LAN) card to provide a data communication connection to a compatible LAN, such as Ethernet. Wireless links may also be implemented. For wireless links, the communications interface 2270 sends or receives or both sends and receives electrical, acoustic or electromagnetic signals, including infrared and optical signals, that carry information streams, such as digital data. For example, in wireless handheld devices, such as mobile telephones like cell phones, the communications interface 2270 includes a radio band electromagnetic transmitter and receiver called a radio transceiver. In certain embodiments, the communications interface 2270 enables connection to the communication network 105 for rendering items in a user interface to the UE 101.

The term "computer-readable medium" as used herein refers to any medium that participates in providing information to processor 2202, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 2208. Volatile media include, for example, dynamic memory 2204. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 2220.

Network link 2278 typically provides information communication using transmission media through one or more networks to other devices that use or process the information. For example, network link 2278 may provide a connection through local network 2280 to a host computer 2282 or to equipment 2284 operated by an Internet Service Provider (ISP). ISP equipment 2284 in turn provides data communication services through the public, world-wide packet-switching communication network of networks now commonly referred to as the Internet 2290.

A computer called a server host 2292 connected to the Internet hosts a process that provides a service in response to information received over the Internet. For example, server host 2292 hosts a process that provides information representing video data for presentation at display 2214. It is contemplated that the components of system 2200 can be deployed in various configurations within other computer systems, e.g., host 2282 and server 2292.

At least some embodiments of the invention are related to the use of computer system 2200 for implementing some or all of the techniques described herein. According to one embodiment of the invention, those techniques are performed by computer system 2200 in response to processor 2202 executing one or more sequences of one or more processor instructions contained in memory 2204. Such instructions, also called computer instructions, software and program code, may be read into memory 2204 from another computer-readable medium such as storage device 2208 or network link 2278. Execution of the sequences of instructions contained in memory 2204 causes processor 2202 to perform one or more of the method steps described herein. In alternative embodiments, hardware, such as ASIC 2220, may be used in place of or in combination with software to implement the invention. Thus, embodiments of the invention are not limited to any specific combination of hardware and software, unless otherwise explicitly stated herein.

The signals transmitted over network link 2278 and other networks through communications interface 2270, carry information to and from computer system 2200. Computer system 2200 can send and receive information, including program code, through the networks 2280, 2290 among others, through network link 2278 and communications interface 2270. In an example using the Internet 2290, a server host 2292 transmits program code for a particular application, requested by a message sent from computer 2200, through Internet 2290, ISP equipment 2284, local network 2280 and communications interface 2270. The received code may be executed by processor 2202 as it is received, or may be stored in memory 2204 or in storage device 2208 or any other non-volatile storage for later execution, or both. In this manner, computer system 2200 may obtain application program code in the form of signals on a carrier wave.

Various forms of computer readable media may be involved in carrying one or more sequence of instructions or data or both to processor 2202 for execution. For example, instructions and data may initially be carried on a magnetic disk of a remote computer such as host 2282. The remote computer loads the instructions and data into its dynamic memory and sends the instructions and data over a telephone line using a modem. A modem local to the computer system 2200 receives the instructions and data on a telephone line and uses an infra-red transmitter to convert the instructions and data to a signal on an infra-red carrier wave serving as the network link 2278. An infrared detector serving as communications interface 2270 receives the instructions and data carried in the infrared signal and places information representing the instructions and data onto bus 2210. Bus 2210 carries the information to memory 2204 from which processor 2202 retrieves and executes the instructions using some of the data sent with the instructions. The instructions and data received in memory 2204 may optionally be stored on storage device 2208, either before or after execution by the processor 2202.

FIG. 23 illustrates a chip set or chip 2300 upon which the example embodiments of the invention may be implemented in any combinations and complementing each other. Chip set 2300 is programmed to render items in a user interface as described herein and includes, for instance, the processor and memory components described with respect to FIG. 22 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 2300 can be implemented in a single chip. It is further contemplated that in certain embodiments the chip set or chip 2300 can be implemented as a single "system on a chip." It is further contemplated that in certain embodiments a separate ASIC would not be used, for example, and that all relevant functions as disclosed herein would be performed by a processor or processors. Chip set or chip 2300, or a portion thereof, constitutes a means for performing one or more steps of providing user interface navigation information associated with the availability of functions. Chip set or chip 2300, or a portion thereof, constitutes a means for performing one or more steps of rendering items in a user interface.

In one embodiment, the chip set or chip 2300 includes a communication mechanism such as a bus 2301 for passing information among the components of the chip set 2300. A processor 2303 has connectivity to the bus 2301 to execute instructions and process information stored in, for example, a memory 2305. The processor 2303 may include one or more processing cores with each core configured to perform independently. A multi-core processor enables multiprocessing within a single physical package. Examples of a multi-core processor include two, four, eight, or greater numbers of processing cores. Alternatively or in addition, the processor 2303 may include one or more microprocessors configured in tandem via the bus 2301 to enable independent execution of instructions, pipelining, and multithreading. The processor 2303 may also be accompanied with one or more specialized components to perform certain processing functions and tasks such as one or more digital signal processors (DSP) 2307, or one or more application-specific integrated circuits (ASIC) 2309. A DSP 2307 typically is configured to process real-world signals (e.g., sound) in real time independently of the processor 2303. Similarly, an ASIC 2309 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 2300 includes merely one or more processors and some software and/or firmware supporting and/or relating to and/or for the one or more processors.

The processor 2303 and accompanying components have connectivity to the memory 2305 via the bus 2301. The memory 2305 includes both dynamic memory (e.g., RAM, magnetic disk, writable optical disk, etc.) and static memory (e.g., ROM, CD-ROM, etc.) for storing executable instructions that when executed perform the inventive steps described herein to render items in a user interface. The memory 2305 also stores the data associated with or generated by the execution of the inventive steps.

Figure 24:
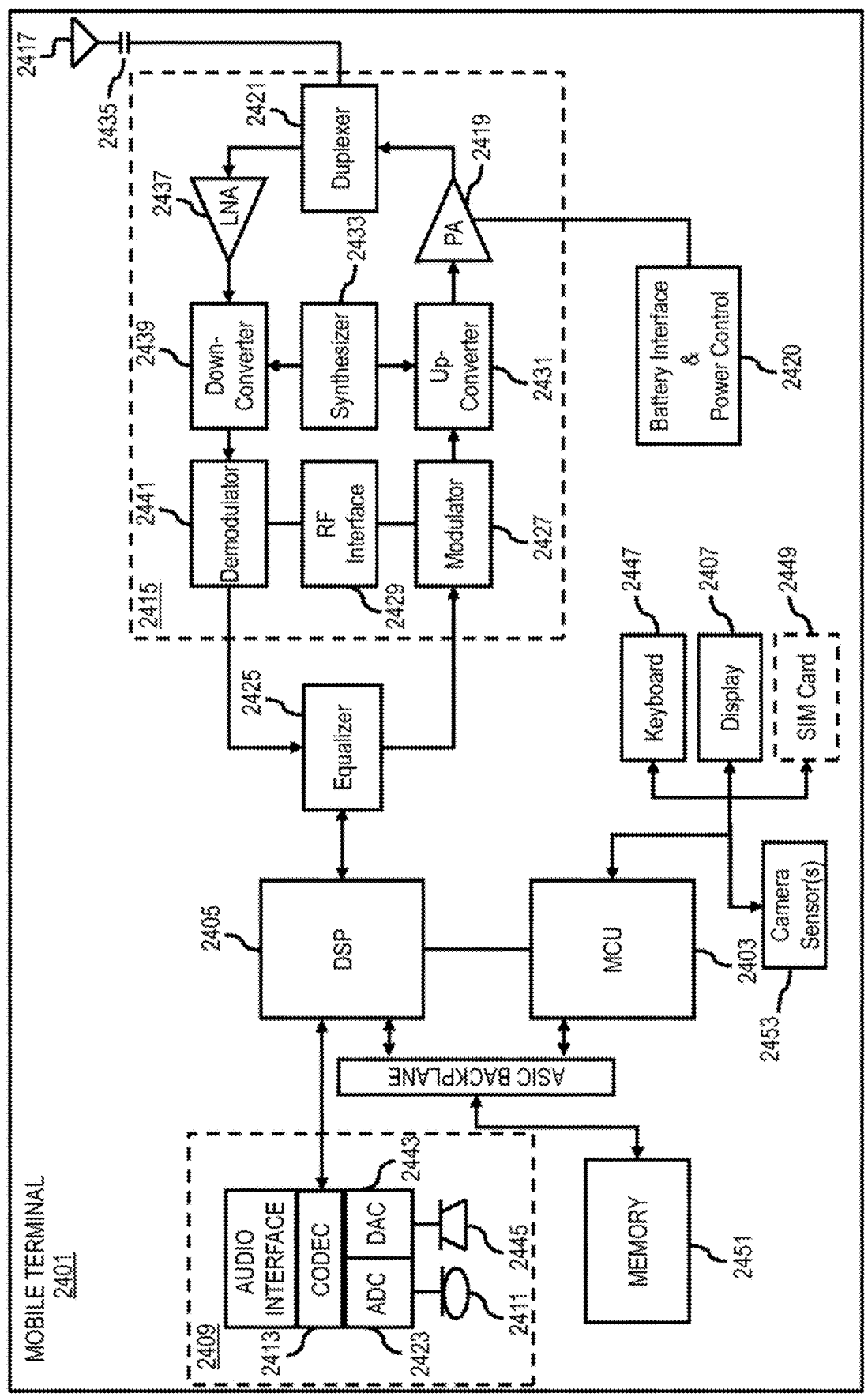
FIG. 24 is a diagram of a mobile terminal (e.g., handset) that can be used to implement the example embodiments of the invention.

FIG. 24 is a diagram of exemplary components of a mobile terminal (e.g., handset) for communications, which is capable of operating in the system of FIG. 1, according to one example embodiment. In some embodiments, mobile terminal 2401, or a portion thereof, constitutes a means for performing one or more steps of rendering items in a user interface. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 2403, a Digital Signal Processor (DSP) 2405, and a receiver/transmitter unit including a microphone gain control unit and a speaker gain control unit. A main display unit 2407 provides a display to the user in support of various applications and mobile terminal functions that perform or support the steps of rendering items in a user interface. The display 2407 includes display circuitry configured to display at least a portion of a user interface of the mobile terminal (e.g., mobile telephone). Additionally, the display 2407 and display circuitry are configured to facilitate user control of at least some functions of the mobile terminal. An audio function circuitry 2409 includes a microphone 2411 and microphone amplifier that amplifies the speech signal output from the microphone 2411. The amplified speech signal output from the microphone 2411 is fed to a coder/decoder (CODEC) 2413.

A radio section 2415 amplifies power and converts frequency in order to communicate with a base station, which is included in a mobile communication system, via antenna 2417. The power amplifier (PA) 2419 and the transmitter/modulation circuitry are operationally responsive to the MCU 2403, with an output from the PA 2419 coupled to the duplexer 2421 or circulator or antenna switch, as known in the art. The PA 2419 also couples to a battery interface and power control unit 2420.

In use, a user of mobile terminal 2401 speaks into the microphone 2411 and his or her voice along with any detected background noise is converted into an analog voltage. The analog voltage is then converted into a digital signal through the Analog to Digital Converter (ADC) 2423. The control unit 2403 routes the digital signal into the DSP 2405 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 2425 for compensation of any frequency-dependent impairments that occur during transmission though the air such as phase and amplitude distortion. After equalizing the bit stream, the modulator 2427 combines the signal with a RF signal generated in the RF interface 2429. The modulator 2427 generates a sine wave by way of frequency or phase modulation. In order to prepare the signal for transmission, an up-converter 2431 combines the sine wave output from the modulator 2427 with another sine wave generated by a synthesizer 2433 to achieve the desired frequency of transmission. The signal is then sent through a PA 2419 to increase the signal to an appropriate power level. In practical systems, the PA 2419 acts as a variable gain amplifier whose gain is controlled by the DSP 2405 from information received from a network base station. The signal is then filtered within the duplexer 2421 and optionally sent to an antenna coupler 2435 to match impedances to provide maximum power transfer. Finally, the signal is transmitted via antenna 2417 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 2401 are received via antenna 2417 and immediately amplified by a low noise amplifier (LNA) 2437. A down-converter 2439 lowers the carrier frequency while the demodulator 2441 strips away the RF leaving only a digital bit stream. The signal then goes through the equalizer 2425 and is processed by the DSP 2405. A Digital to Analog Converter (DAC) 2443 converts the signal and the resulting output is transmitted to the user through the speaker 2445, all under control of a Main Control Unit (MCU) 2403 which can be implemented as a Central Processing Unit (CPU).

The MCU 2403 receives various signals including input signals from the keyboard 2447. The keyboard 2447 and/or the MCU 2403 in combination with other user input components (e.g., the microphone 2411) comprise a user interface circuitry for managing user input. The MCU 2403 runs a user interface software to facilitate user control of at least some functions of the mobile terminal 2401 to render items in a user interface. The MCU 2403 also delivers a display command and a switch command to the display 2407 and to the speech output switching controller, respectively. Further, the MCU 2403 exchanges information with the DSP 2405 and can access an optionally incorporated SIM card 2449 and a memory 2451. In addition, the MCU 2403 executes various control functions required of the terminal. The DSP 2405 may, depending upon the implementation, perform any of a variety of conventional digital processing functions on the voice signals. Additionally, DSP 2405 determines the background noise level of the local environment from the signals detected by microphone 2411 and sets the gain of microphone 2411 to a level selected to compensate for the natural tendency of the user of the mobile terminal 2401.

The CODEC 2413 includes the ADC 2423 and DAC 2443. The memory 2451 stores various data including call incoming tone data and is capable of storing other data including music data received via, e.g., the global Internet. The software module could reside in RAM memory, flash memory, registers, or any other form of writable storage medium known in the art. The memory device 2451 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 2449 carries, for instance, important information, such as the cellular phone number, the carrier supplying service, subscription details, and security information. The SIM card 2449 serves primarily to identify the mobile terminal 2401 on a radio network. The card 2449 also contains a memory for storing a personal telephone number registry, text messages, and user specific mobile terminal settings.

Further, one or more camera sensors 2453 may be incorporated onto the mobile station 2401 wherein the one or more camera sensors may be placed at one or more locations on the mobile station. Generally, the camera sensors may be utilized to capture, record and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. An apparatus comprising:
   at least one processor; and
   at least one memory including computer program code for one or more programs,
   the at least one memory and the computer program code configured to, with the at least one processor, cause the apparatus to perform at least the following:
   process a current orientation mode of a device, a detected attitude change of the device, and an attitude change threshold to determine a new orientation mode for the device;
   responsive to the detected attitude change of the device satisfying the attitude change threshold, switch to the new orientation mode; and
   responsive to the new orientation mode comprising a landscape orientation mode, cause to present representations of a plurality of points of interest (POIs) and navigation information associated with respective ones of the plurality of POIs in an augmented reality display, wherein a size that the representations of the plurality of POIs are rendered in the augmented reality display is based on a geographical distance of the respective ones of the plurality of POIs from the device,
   wherein a portion of the augmented reality display of the device is configured to provide a zoom function, and wherein responsive to the device being pointed in a direction of a respective POI and a representation of the respective POI overlapping with the portion of the augmented reality display, the at least one memory and the computer program code being further configured to, with the at least one processor, cause the apparatus to enlarge the representation of the respective POI.

2. The apparatus of claim 1, wherein the navigation information comprises one or more of: a device location, a destination location, relationships between the device location and the destination location, directions for travelling between the device location and the destination location, relative positions of the device location and the destination location, directions to the destination location, associations between the device location and the destination location, street and path information, or one or more indicators indicative of a direction towards the destination location, and wherein the destination location is one of the plurality of POIs.

3. The apparatus of claim 2, wherein the one or more indicators comprise an arrow or a pointer.

4. The apparatus of claim 1, wherein the landscape orientation mode is a camera view mode.

5. The apparatus of claim 4, wherein the at least one memory and the computer program code are further configured to, with the at least one processor, cause the apparatus to:
   cause to present one or more floating objects as superimposed on the camera view mode of the device.

6. The apparatus of claim 1, wherein the at least one memory and the computer program code are further configured to, with the at least one processor, cause the apparatus to:
   estimate the detected attitude change based on an attitude change from an orientation associated with the current orientation mode of the device.

7. The apparatus of claim 1, further comprising:
   responsive to the new orientation mode comprising a portrait orientation mode, cause to present a list of the plurality of POIs and navigation information associated with the plurality of POIs, wherein the list of the plurality of POIs is ordered based on the geographical distance of respective ones of the plurality of POIs from the device.

8. The apparatus of claim 1, wherein the at least one memory and the computer program code are further configured to, with the at least one processor, cause the apparatus to:
   enlarge by modifying or expanding the representation of the one of the plurality of POIs to display additional information associated with the one of the plurality of POIs.

9. A computer program product comprising a non-transitory computer-readable storage medium having computer executable program code stored therein, the computer executable program code comprising program code instructions for:
   processing a current orientation mode of a device, a detected attitude change of the device, and an attitude change threshold to determine a new orientation mode for the device;
   responsive to the detected attitude change of the device satisfying the attitude change threshold, switching to the new orientation mode; and
   responsive to the new orientation mode comprising a landscape orientation mode, causing to present representations of a plurality of points of interest (POIs) and navigation information associated with respective ones of the plurality of POIs in an augmented reality display, wherein a size that the representations of the plurality of POIs are rendered in the augmented reality display is based on a geographical distance of the respective ones of the plurality of POIs from the device,
   wherein a portion of the augmented reality display of the device is configured to provide a zoom function, and wherein responsive to the device being pointed in a direction of a respective POI and a representation of the respective POI overlapping with the portion of the augmented reality display, the at least one memory and the computer program code being further configured to, with the at least one processor, cause the apparatus to enlarge the representation of the respective POI.

10. A computer program product of claim 9, wherein the navigation information comprises one or more of: a device location, a destination location, relationships between the device location and the destination location, directions for travelling between the device location and the destination location, relative positions of the device location and the destination location, directions to the destination location, associations between the device location and the destination location, street and path information, or one or more indicators indicative of a direction towards the destination location, and wherein the destination location is one of the plurality of POIs.

11. The computer program product of claim 10, wherein the one or more indicators comprise an arrow or a pointer.

12. The computer program product of claim 9, wherein the landscape orientation mode is a camera view mode.

13. The computer program product of claim 12, wherein the computer executable program code further comprises program code instructions for:
causing to present one or more floating objects as superimposed on the camera view mode of the device.

14. The computer program product of claim 9, wherein the computer executable program code further comprises program code instructions for:
estimating the detected attitude change based on an attitude change from an orientation associated with the current orientation mode of the device.

15. A method comprising:
processing a current orientation mode of a device, a detected attitude change of the device, and an attitude change threshold to determine a new orientation mode for the device;
responsive to the detected attitude change of the device satisfying the attitude change threshold, switching to the new orientation mode; and
responsive to the new orientation mode comprising a landscape orientation mode, causing to present representations of a plurality of points of interest (POIs) and navigation information associated with respective ones of the plurality of POIs in an augmented reality display, wherein a size that the representations of the plurality of POIs are rendered in the augmented reality display is based on a geographical distance of the respective ones of the plurality of POIs from the device,
wherein a portion of the augmented reality display of the device is configured to provide a zoom function, and wherein responsive to the device being pointed in a direction of a respective POI and a representation of the respective POI overlapping with the portion of the augmented reality display, the at least one memory and the computer program code being further configured to, with the at least one processor, cause the apparatus to enlarge the representation of the respective POI.

16. The method according to claim 15, wherein the navigation information comprises one or more of: a device location, a destination location, relationships between the device location and the destination location, directions for travelling between the device location and the destination location, relative positions of the device location and the destination location, directions to the destination location, associations between the device location and the destination location, street and path information, or one or more indicators indicative of a direction towards the destination location, and wherein the destination location is one of the plurality of POIs.

17. The method according to claim 16, wherein the one or more indicators comprises an arrow or a pointer.

18. The method according to claim 15, wherein the landscape orientation mode is a camera view mode.

19. The method according to claim 18, further comprising:
causing to present one or more floating objects as superimposed on the camera view mode of the device.

* * * * *

UNITED STATES PATENT AND TRADEMARK OFFICE
CERTIFICATE OF CORRECTION

| | | |
|---|---|---|
| PATENT NO. | : 11,990,108 B2 | Page 1 of 1 |
| APPLICATION NO. | : 17/504088 | |
| DATED | : May 21, 2024 | |
| INVENTOR(S) | : Sreejumon Purayil et al. | |

It is certified that error appears in the above-identified patent and that said Letters Patent is hereby corrected as shown below:

In the Drawings

In sheet 09 of 26, FIG. 9, reference numeral 905, Line 2, delete "Visibility==Collpased" and insert -- Visibility==Collapsed --, therefor.

In sheet 17 of 26, FIG. 15, reference numeral 1523, Line 1, delete "indivdual" and insert -- individual --, therefor.

In the Claims

In Column 42, Line 64, Claim 10, delete "A computer" and insert -- The computer --, therefor.

Signed and Sealed this
Seventeenth Day of December, 2024

Derrick Brent
*Acting Director of the United States Patent and Trademark Office*